US010766427B2

(12) United States Patent
Livingston et al.

(10) Patent No.: US 10,766,427 B2
(45) Date of Patent: Sep. 8, 2020

(54) VEHICLE LADDER RACK ASSEMBLY

(71) Applicant: Adrian Steel Company, Adrian, MI (US)

(72) Inventors: Nolin Miller Livingston, Sylvania, OH (US); Mark Anthoney Henry, Jr., Adrian, MI (US)

(73) Assignee: Adrian Steel Company, Adrian, MI (US)

( * ) Notice: Subject to any disclaimer, the term of this patent is extended or adjusted under 35 U.S.C. 154(b) by 0 days.

(21) Appl. No.: 16/432,316

(22) Filed: Jun. 5, 2019

(65) Prior Publication Data
US 2019/0375336 A1 Dec. 12, 2019

Related U.S. Application Data

(60) Provisional application No. 62/681,339, filed on Jun. 6, 2018.

(51) Int. Cl.
*B60R 9/042* (2006.01)

(52) U.S. Cl.
CPC .................. *B60R 9/0423* (2013.01)

(58) Field of Classification Search
CPC ............... B60R 9/0423; B60R 9/0485
See application file for complete search history.

(56) References Cited

U.S. PATENT DOCUMENTS

| | | | | |
|---|---|---|---|---|
| 3,251,519 A | * | 5/1966 | Jones ................... | B60R 9/0485 224/324 |
| 3,722,766 A | * | 3/1973 | Barrineau ............ | B60R 9/0485 224/324 |
| 3,826,390 A | * | 7/1974 | Watson ................ | B60R 9/0423 414/462 |
| 3,963,136 A | * | 6/1976 | Spanke ................ | B60R 9/0423 414/462 |
| 4,170,331 A | * | 10/1979 | Faulstich ................. | E06C 5/24 182/127 |
| 4,390,117 A | * | 6/1983 | Fagan ................... | B60R 9/0485 182/127 |
| 4,439,086 A | * | 3/1984 | Thede ...................... | B60R 9/08 224/310 |

(Continued)

OTHER PUBLICATIONS

Kargo Master, 40816 Parts List, Hardware List, and Installation Instructions, Version 2, undated, 3 pages.

*Primary Examiner* — Brian D Nash
(74) *Attorney, Agent, or Firm* — Marshall & Melhorn, LLC

(57) ABSTRACT

A ladder rack assembly for use on a motor vehicle. The ladder rack assembly has a sliding member that is linearly slidable relative to a base member and a ladder mounting member that is axially and radially movable relative to the base member. A first end portion of one or more first drive members are drivingly connected to at least a portion of one or more first shafts and a second end portion is pivotably connected to a first end portion of a first side portion of the ladder mounting member. One or more first linkage members drivingly connect the one or more first drive members to the sliding member. A first end portion of the one or more first linkage members are pivotably connected top the one or more first drive members and a second end portion are pivotably connected to a first end portion of the sliding member.

22 Claims, 20 Drawing Sheets

(56) References Cited

U.S. PATENT DOCUMENTS

| | | | | | |
|---|---|---|---|---|---|
| 4,618,083 | A | * | 10/1986 | Weger, Jr. | B60R 9/0485 224/309 |
| 4,827,742 | A | * | 5/1989 | McDonald | B60R 9/0485 182/127 |
| 4,858,725 | A | * | 8/1989 | Griffin | B60R 9/0423 182/127 |
| 4,887,750 | A | * | 12/1989 | Dainty | B60R 9/0423 224/42.11 |
| 5,058,791 | A | * | 10/1991 | Henriquez | B60R 9/0423 224/310 |
| 5,104,280 | A | * | 4/1992 | Ziaylek | B60R 9/0423 280/4 |
| 5,242,094 | A | * | 9/1993 | Finley | B60R 9/0485 182/127 |
| 5,360,150 | A | * | 11/1994 | Praz | B60R 9/042 224/280 |
| 5,423,650 | A | * | 6/1995 | Zerbst | B60R 9/042 224/310 |
| 5,791,857 | A | * | 8/1998 | Ziaylek, Jr. | E06O 5/04 182/127 |
| 5,850,891 | A | * | 12/1998 | Olms | B60R 9/0423 182/127 |
| 5,884,824 | A | * | 3/1999 | Spring, Jr. | B60R 9/042 224/309 |
| 6,092,972 | A | * | 7/2000 | Levi | B60R 9/0423 224/310 |
| 6,099,231 | A | * | 8/2000 | Levi | B60R 9/0423 224/310 |
| 6,113,327 | A | * | 9/2000 | Schrader | B60R 9/0485 182/8 |
| 6,179,543 | B1 | * | 1/2001 | Adame | B60R 9/0423 224/310 |
| 6,315,181 | B1 | | 11/2001 | Bradley et al. | |
| 6,360,930 | B1 | | 3/2002 | Flickenger | |
| 6,427,889 | B1 | | 8/2002 | Levi | |
| 6,428,263 | B1 | | 8/2002 | Schellens | |
| 6,764,268 | B2 | | 7/2004 | Levi | |
| 6,854,627 | B2 | * | 2/2005 | Foo | B60R 9/048 182/127 |
| 7,097,409 | B2 | | 8/2006 | Richter | |
| 9,132,780 | B2 | | 9/2015 | Sautter, Jr. et al. | |
| 9,132,781 | B2 | | 9/2015 | Thibault | |
| 9,156,411 | B2 | | 10/2015 | Elezaj | |
| 9,193,304 | B2 | | 11/2015 | Svaldi et al. | |
| 9,327,654 | B2 | | 5/2016 | Richter et al. | |
| 9,346,409 | B2 | | 5/2016 | Pfaeffi | |
| 9,415,726 | B2 | | 8/2016 | Levi | |
| 9,463,748 | B2 | | 10/2016 | Presley | |
| 9,694,756 | B2 | | 7/2017 | Pullman et al. | |
| 9,783,119 | B1 | | 10/2017 | Lachance et al. | |
| 9,796,340 | B2 | | 10/2017 | Bharucha | |
| 9,987,995 | B2 | | 6/2018 | Paunov et al. | |
| 10,017,124 | B2 | | 7/2018 | Lachance et al. | |
| 2001/0009637 | A1 | * | 7/2001 | Schrader | B60P 7/0823 410/97 |
| 2015/0069101 | A1 | * | 3/2015 | Presley | B60R 9/042 224/310 |
| 2017/0144602 | A1 | | 5/2017 | Kelly et al. | |
| 2017/0144605 | A1 | | 5/2017 | Kelly et al. | |
| 2018/0162288 | A1 | | 6/2018 | Sautter et al. | |
| 2018/0244208 | A1 | | 8/2018 | Willis | |
| 2018/0257577 | A1 | | 9/2018 | Livingston et al. | |

* cited by examiner

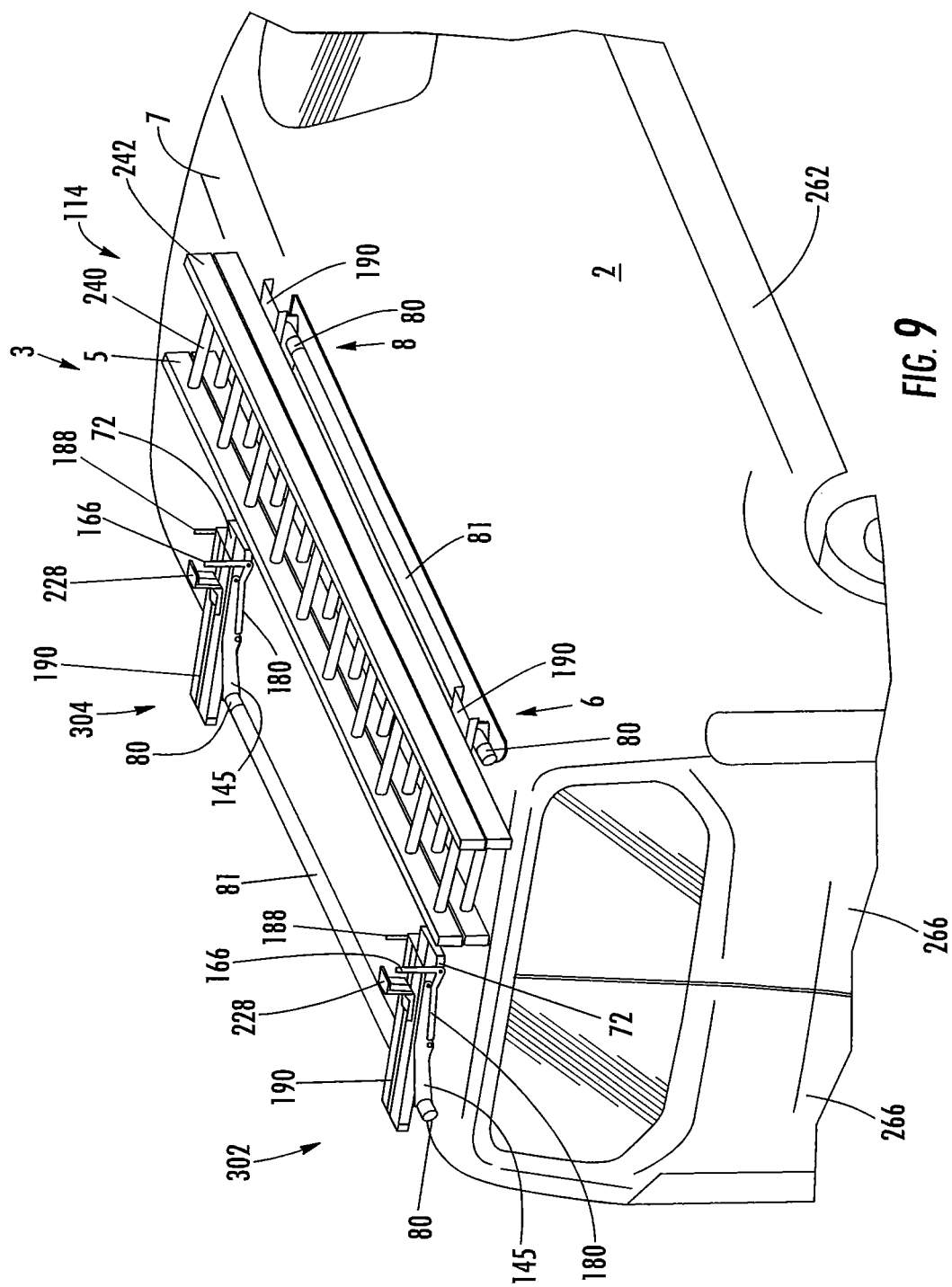

VEHICLE LADDER RACK ASSEMBLY

CROSS REFERENCE TO RELATED APPLICATIONS

The present application claims the benefit to U.S. Provisional Patent Application No. 62/681,339 filed on Jun. 6, 2018, which is incorporated herein by reference in its entirety.

FIELD OF THE DISCLOSURE

The present disclosure relates to a ladder rack assembly for use on a vehicle. More particularly, the present disclosure relates to a compact ladder rack that lowers from the vehicle to a height that allows convenient access to a ladder while also allowing access to the vehicle.

BACKGROUND OF THE DISCLOSURE

Ladder racks for use with vehicles are known devices. Typically, the ladder rack functions to retain a ladder on the vehicle, such as on the roof of the vehicle, to free up space within the vehicle. In some cases, the ladders are too large to fit within an interior the vehicle and therefore must be stored on the outside of the vehicle.

Conventional ladder racks are to be fixed in place. However the conventional ladder racks, do not present the ladder to the user in an ergonomically correct manner. As a result, the conventional ladder racks ultimately result in injury to the user(s) as they stretch and/or strain to put the ladder onto the ladder rack and/or take the ladder off of the ladder rack.

Additionally, the conventional ladder racks suffer from the disadvantage that when lowered, they block vital portions of the vehicle that need to be accessed. For example, the conventional ladder racks lower directly in front of the rear door(s) and/or side door(s) of a vehicle. As a result, when the conventional ladder racks are lowered, they prevent the user(s), owners) and/or operator(s) from being able to access the interior of the vehicle. Additionally, in the case of vehicles that have exterior storage bin(s), locker(s) and/or compartment(s), the conventional ladder racks when lowered prevent the user(s), owner(s) and/or operator(s) from being able to access these areas as well.

Furthermore, the conventional ladder racks also significantly increase the overall profile of the vehicle. For example, many conventional ladder racks add many inches, if not feet, to the overall height of the vehicle. Ladder rack assemblies are not installed on vehicles by original equipment manufactures (OEMs) and are therefore added as optional aftermarket parts. When these vehicles are transported by using a rail car, the rail cars are not high enough or tall enough to accommodate the vehicle with the ladder rack installed thereon. This is because the rail cars are designed to receive and transport the vehicle as dispatched from the OEM and do not take into account any additional height or width that one or more aftermarket parts may add to the vehicle. As a result, this increases the overall costs associated with the shipping of the vehicle to the owner(s) and/or operator(s) of the vehicle.

The additional height added to the vehicle by the conventional ladder rack assemblies is also disadvantageous, particularly for transport purposes, as it places an undue limitation on the places that the vehicle can go. As a result, this may require the operator of the vehicle to take a less direct rout which typically results in more travel time, less work time, loss profits, increased vehicle maintenance expenses and/or increased fuel costs. Additionally, the additional height of the conventional ladder rack assembly may prevent the vehicle from getting close to the work site which. This results in increased vehicle unloading times, increased vehicle loading times, reduced working time, injury to workers due to the increased stress and/or strain on the worker's body to transport the ladder and/or tools the increased distance to the vehicle. As a result, the additional height of the conventional ladder rack assemblies aids in increasing the overall costs associated with the ladder rack assembly.

As a result, it would therefore be advantageous to develop a ladder rack assembly that can be easily raised and lowered, that is easily and safely accessible by an owner(s) and/or operator(s) when in the lowered position, has a compact nature such that it can be easily shipped after being installed onto the vehicle, and does not block and/or obstruct and window(s), door(s) and/or storage area(s) of the vehicle when the ladder rack in the lowered position.

SUMMARY OF THE DISCLOSURE

A ladder rack assembly for use on a motor vehicle is disclosed. The ladder rack assembly has a sliding member that is linearly slidable relative to a base member. Additionally, the ladder rack assembly has a ladder mounting member that is axially and radially movable relative to the base member. A first end portion of one or more first drive members are drivingly connected to at least a portion of one or more first shafts and a second end portion of the one or more first drive members is pivotably connected to a first end portion of a first side portion of the ladder mounting member. One or more first linkage members drivingly connect the one or more first drive members to the sliding member. A first end portion of the one or more first linkage members are pivotably connected top the one or more first drive members and a second end portion are pivotably connected to a first end portion of the sliding member.

According to the previous aspect of the disclosure, the ladder rack assembly may have a first position, a second position, and a third position. When in the first position, the ladder rack assembly may be in a compact form factor allowing one or more ladders to be stored thereon. The second position may be an intermediate position between the first and third portions. When in the third position, at least a portion of the ladder mounting member may be disposed adjacent to and a distance away from said base member and/or said sliding member.

According to any one of the previous aspects of the disclosure, the base member may have one or more first bumper members and at least a portion of the sliding member may be in direct contact with at least a portion of the one or more first numbers when the ladder rack assembly is in the first position.

According to any one of the previous aspects of the disclosure, the sliding member may have one or more first cut-back portions extending inward from at least a portion of the first end of a central top portion of the sliding member. The one or more first cut-back portions may have a size and shape to receive and/or retain at least a portion of the one or more first bumper members therein. At least a portion of the one or more first cut-back portions may be in direct contact with at least a portion of the one or more first bumper members when the ladder rack assembly is in the first position.

According to any one of the previous aspects of the disclosure, when in the first position, a central top portion of the ladder mounting member may be substantially parallel to and disposed directly radially outboard from at least a portion of a central top portion of the sliding member. Additionally, when in the first position, the central top portion of the sliding member may be substantially parallel to and disposed directly radially outboard form at least a portion of a central portion of the base member.

According to any one of the previous aspects of the disclosure, when in the third position, at least a portion of one or more second bumper members connected to the inner surface of the ladder mounting member may be in direct contact with at least a portion of the outer surface of the sliding member.

According to any one of the previous aspects of the disclosure, when in the third position, at least a portion of the sliding member may be disposed axially outboard from the base member and at least a portion of a central top portion of the sliding member may be substantially parallel to at least a portion of a central portion of the base member. Additionally, when in the third position, at least a portion of the ladder mounting member may be disposed axially outward from and may extend substantially vertical relative to at least a portion of the base member and the sliding member.

According to any one of the previous aspects of the disclosure, the ladder rack assembly may include one or more first mounting members and one or more first assist members. At least a portion of the one or more first mounting members may extend outward from at least a portion of the first end portion of the base member. Additionally, at least a portion of one or more first ball studs may be integrally connected to or integrally formed as part of the one or more first mounting members. Furthermore, at least a portion of one or more third ball studs may be integrally connected to or integrally formed as part of the intermediate portion of the one or more first drive members. Still further, at least a portion of an end of the one or more first assist members may be connected to at least a portion of the one or more first ball studs and the one or more third ball studs.

According to any one of the previous aspects of the disclosure, the one or more first assist members may be one or more dampers, one or more hydraulic dampers, one or more pneumatic dampers, one or more hydraulic cylinders, one or more pneumatic cylinders and/or one or more gas springs.

According to any one of the previous aspects of the disclosure, the sliding member may have one or more second cut-back portions. The one or more second cut-back portions may extend inward from at least a portion of the first end of the first side portion of the sliding member. Additionally, the one or more second cut-back portions may be of a size and shape to receive and/or retain at least a portion of the one or more first mounting members of the base member when the ladder rack assembly is in a first position.

According to any one of the previous aspects of the disclosure, the ladder rack assembly may include one or more first arms. At least a portion of the one or more first arms may be integrally connected to or integrally formed as part of at least a portion of the second end portion of the one or more first linkage members. The one or more first arms may have one or more first apertures therein allowing the one or first more arms to be laid substantially parallel to the base member, the sliding member and/or the ladder mounting member.

According to any one of the previous aspects of the disclosure, the ladder rack assembly may include one or more second drive members and one or more second linkage members. The one or more second drive members may have a first end portion, a second end portion and an intermediate portion interposed between said first and second end portions. At least a portion of the first end portion of the one or more second drive members may be drivingly connected to at least a portion of the one or more first shafts. Additionally, at least a portion of the second end portion of the one or more second drive members may be pivotably connected to at least a portion of said first end portion of the second side portion of the ladder mounting member. The one or more second linkage members may have a first end portion and a second end portion. At least a portion of the first end portion of the one or more second linkage members may be pivotably connected to at least a portion of the intermediate portion of the one or more second drive members. Additionally, at least a portion of the second end portion of the one or more second linkage members may be pivotably connected to at least a portion of the first end portion of the sliding member.

According to any one of the previous aspects of the disclosure, the ladder rack assembly may include one or more second arms. At least a portion of the one or more second arms may be integrally connected to or integrally formed as part of at least a portion of the second end portion of the one or more second linkage members. The one or more second arms may have one or more first apertures therein allowing the one or second more arms to be laid substantially parallel to the base member, the sliding member and/or the ladder mounting member.

According to any one of the precious aspects of the disclosure, the ladder rack assembly may include one or more second mounting members and one or more second assist members. At least a portion of the one or more second mounting members may extend outward from at least a portion of the first end portion of the base member. Additionally, at least a portion of one or more second ball studs may be integrally connected to or integrally formed as part of the one or more second mounting members. Furthermore, at least a portion of one or more fourth ball studs may be integrally connected to or integrally formed as part of the intermediate portion of the one or more second drive members. Still further, at least a portion of an end of the one or more second assist members may be connected to at least a portion of the one or more second ball studs and the one or more fourth ball studs.

According to any one of the previous aspects of the disclosure, where one or more second assist members are one or more dampers, one or more hydraulic dampers, one or more pneumatic dampers, one or more hydraulic cylinders, one or more pneumatic cylinders and/or one or more gas springs.

According to any one of the previous aspects of the disclosure, the sliding member may have one or more third cut-back portions. The one or more third cut-back portions may extend inward from at least a portion of the first end of the second side portion of the sliding member. Additionally, the one or more third cut-back portions may be of a size and shape to receive and/or retain at least a portion of the one or more second mounting members of the base member when the ladder rack assembly is in a first position.

According to any one of the previous aspect of the disclosure, the ladder rack assembly may include one or more retention members having one or more retaining portions. At least a portion of the one or more retention members may be selectively connectable to at least a portion of the ladder mounting member. Additionally, at least a portion of the one or more retaining portions of the one or more retaining members may be selectively movable relative to the one or more retention members in order to retain at least a portion of one or more ladders therein.

According to any one of the previous aspects of the disclosure, the ladder rack assembly may include one or more third mounting members and/or one or more fourth mounting members. At least a portion of the one or more third mounting member and/or the one or more fourth mounting member may extend outward from at least a portion of the second end portion of the base member. Additionally, at least a portion of the one or more third mounting member and/or the one or more fourth mounting member may be connected to at least a portion of the one or more first shafts.

According to any one of the previous aspects of the disclosure, the sliding member may have one or more first sliding member flanges and/or one or more second sliding member flanges. The one or more first sliding member flanges may extend inward from at least a portion of an end of the first side portion of the sliding member opposite a central top portion of the sliding member. Additionally, the one or more second sliding member flanges extend inward from at least a portion of an end of the second side portion of the sliding member opposite the central top portion of the sliding member. Furthermore, the one or more first sliding member flanges, the first side portion, and the central top portion of the sliding member may define a first sliding member space. Still further, the one or more second sliding member flanges, the second side portion, and the central top portion of the sliding member may define a second sliding member space. The first sliding member space and/or the second sliding member space may be of a size and shape to receive and/or retain at least a portion of the base member therein.

According to any one of the previous aspects of the disclosure, the ladder mounting member may have as one or more first ladder mounting member flanges and/or one or more second ladder mounting member flanges. The one or more first ladder mounting member flanges may extend inward from an end of the first side portion of the ladder mounting member opposite a central top portion of the ladder mounting member. Additionally, the one or more second ladder mounting member flanges may extend inward from an end of the second side portion of the ladder mounting member opposite the central top portion of the ladder mounting member. Furthermore, the one or more first ladder mounting member flanges, the first side portion, and the central top portion of the ladder mounting member may define a first ladder mounting member space. Still further, the one or more second ladder mounting member flanges, the second side portion, and the central top portion of the ladder mounting member may define a second ladder mounting member space. The first ladder mounting member space and/or the second ladder mounting member space may be of a size and shape to receive and/or retain at least a portion of one or more first and/or second rolling members connected to the second end portion of the sliding member therein.

According to any one of the previous aspects of the disclosure, at least a portion of an end of the one or more first shafts may be drivingly connected to at least a portion of a source of rotational power.

According to any one of the previous aspects of the disclosure, the source of rotational power may be one or more motors, one or more electric motors, one or more ratchet assemblies, one or more lever assemblies, one or more pulley assemblies, one or more chain drive assemblies, one or more shafts, one or more rods, one or more bars, and/or one or more gear assemblies.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 9 is a schematic perspective view of a vehicle having a ladder rack assembly according to an alternative embodiment of the disclosure where the ladder rack assembly is in a first position;

DETAILED DESCRIPTION

Figure 1:
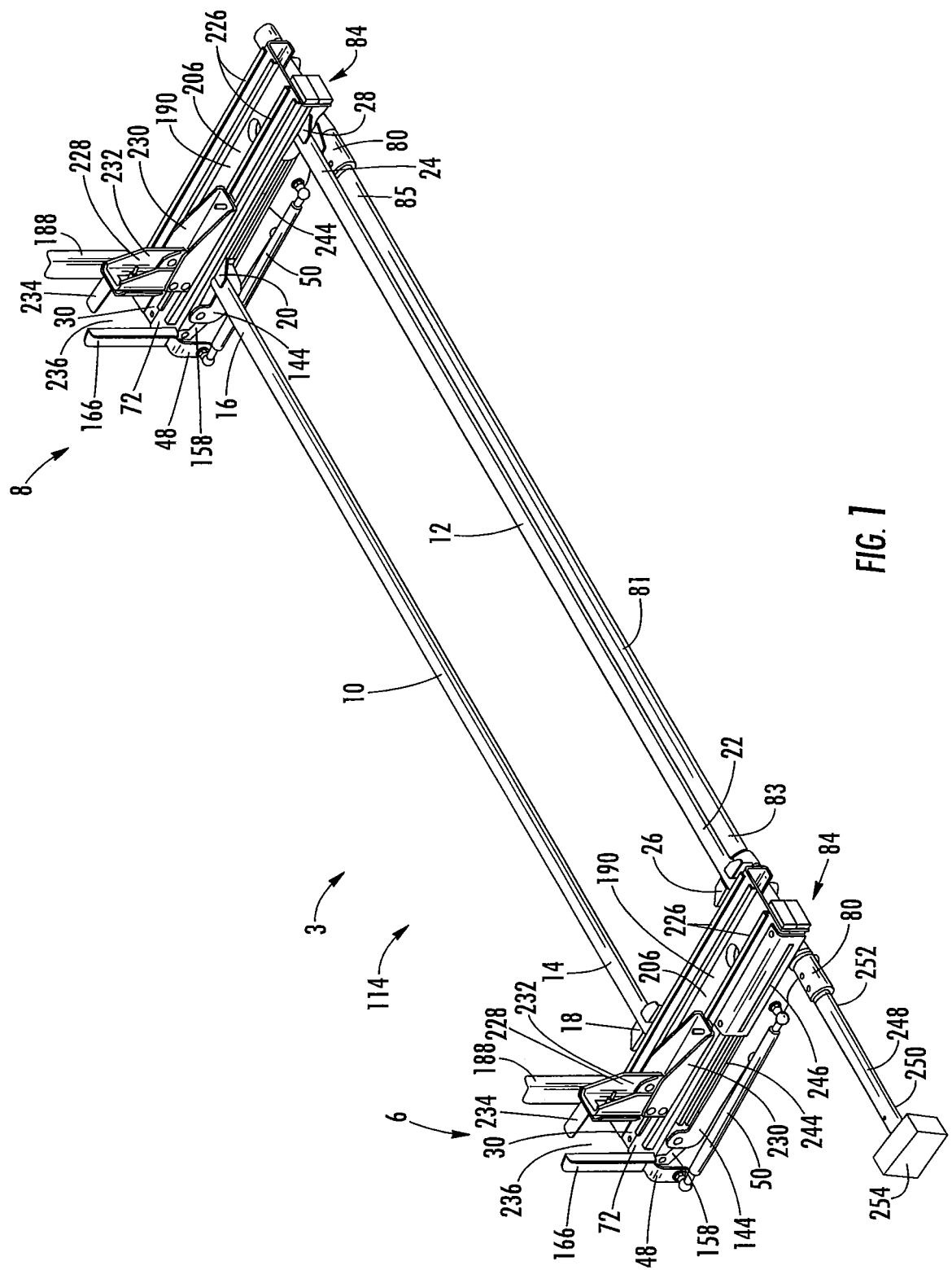
FIG. 1 is a schematic perspective view of a portion of a ladder rack assembly according to an embodiment of the disclosure.

It is to be understood that the device and/or process described herein may assume various alternative orientations and step sequences, except where expressly specified to the contrary. It is also to be understood that the specific devices and processes illustrated in the attached drawings, and described in the following specification are simply exemplary embodiments of the concepts defined in the appended claims. Hence, specific dimensions, directions or other physical characteristics relating to the embodiments disclosed are not to be considered as limiting, unless the claims expressly state otherwise.

Additionally, it is within the scope of this disclosure, and as a non-limiting example, that the ladder rack assembly disclosed herein may be used in automotive, off-road vehicle, all-terrain vehicle, construction, structural, marine, aerospace, locomotive, military, machinery, robotic and/or consumer product applications. Additionally, as a non-limiting example, the ladder rack assembly disclosed herein may also be used in passenger vehicles, electric vehicles, hybrid vehicles, commercial vehicles, autonomous vehicles, semi-autonomous vehicles and/or heavy vehicle applications.

FIGS. 1-8 provide a schematic illustration of a vehicle 2 having a first ladder rack assembly 3 and/or a second ladder rack assembly 4 according to an embodiment of the disclosure. The first and second ladder rack assemblies 3 and 4 allow one or more ladders 5 to be selectively stored, transported and/or retained on the vehicle 2. Additionally, the first and second ladder rack assemblies 3 and 4 aid in allowing one or more users (not shown) to quickly, easily, safely, and conveniently retrieve the one or more ladders 5 from the vehicle 2 when needed. It is within the scope of this disclosure and as a non-limiting example that the first and second ladder rack assemblies 3 and 4 may be separate components, but identical in their construction. Additionally, it is within the scope of this disclosure and as a non-limiting example that at least a portion of the first and/or second ladder rack assemblies 3 and/or 4 may be attached to at least a portion of a roof 7, a roof rack (not shown) and/or a utility rack (not shown) of the vehicle 2.

As best seen in FIG. 1 of the disclosure and as a non-limiting example, the first ladder rack assembly 3 may have a first mechanism 6 and/or a second mechanism 8. The first and/or second mechanism 6 and/or 8 may be used in order to aid one or more users (not shown) to selectively store, transport, retain, and/or retrieve the one or more ladders 5 quickly, easily, safely, and conveniently as needed. It is within the scope of this disclosure and as a non-limiting example that the first and second mechanisms 6 and 8 may be separate components, but identical in their construction. According to an embodiment of the disclosure and as a non-limiting example, at least a portion of the first and/or second mechanisms 6 and/or 8 may extend along at least a portion of a width W of the vehicle 2.

At least a portion of the first mechanism 6 may be connected to at least a portion of the second mechanism 8 by using one or more first attachment members 10 and/or one or more second attachment members 12 that extend along at least a portion of a length L of the vehicle 2. The one or more first attachment members 10 may have a first end portion 14 connected to at least a portion of the first mechanism 6 and a second end portion 16 connected to at least a portion of the second mechanism 8 of the first ladder rack assembly 3. It is within the scope of this disclosure and as a non-limiting example that the one or more first attachment members 10 may be integrally formed as part of the first and second mechanisms 6 and 8. Additionally, it is within the scope of this disclosure and as a non-limiting example that the one or more first attachment members 10 may be integrally connected to at least a portion of the first and second mechanisms 6 and 8 by using one or more mechanical fasteners, one or more welds, one or more adhesives, an interference fit connection, a spline connection, a snap-fit type connection and/or a threaded connection.

In accordance with the embodiment illustrated in FIG. 1 of the disclosure and as a non-limiting example, the first ladder rack assembly 3 may include one or more first joining members 18. The one or more first joining members 18 may be used in order to aid in providing a rigid and secure connection between the one or more first attachment members 10 and the first mechanism 6 of the first ladder rack assembly 3. As best seen in FIG. 1 of the disclosure and as a non-limiting example, at least a portion of the one or more first joining members 18 may be connected to at least a portion of the first end portion 14 of the one or more first attachment members 10 and the first mechanism 6 of the first ladder rack assembly 3. It is within the scope of this disclosure and as a non-limiting example that the one or more first joining members 18 may be integrally formed as part of the one or more first attachment members 10 and/or may be integrally formed as part of at least a portion of the first mechanism 6. Additionally, it is within the scope of this disclosure and as a non-limiting example that the one or more first joining members 18 may be integrally connected to at least a portion of the first mechanism 6 and/or to at last a portion of the first attachment member 10 by using one or more mechanical fasteners, one or more welds, one or more adhesives, an interference fit connection, a spline connection, a snap-fit type connection and/or a threaded connection. As a non-limiting example, the one or more first joining members 18 may be one or more gussets, one or more gusset plates and/or one or more brackets.

According to the embodiment illustrated in FIG. 1 and as a non-limiting example, the first ladder rack assembly 3 may include one or more second joining members 20. The one or more second joining members 20 may be used in order to aid in providing a rigid and secure connection between the one or more first attachment members 10 and the second mechanism 8 of the first ladder rack assembly 3. As best seen in FIG. 1 of the disclosure and as a non-limiting example, at least a portion of the one or more second joining members 20 may be connected to at least a portion of the second end portion 16 of the one or more first attachment members 10 and the second mechanism 8 of the first ladder rack assembly 3. It is within the scope of this disclosure and as a non-limiting example that the one or more second joining members 20 may be integrally formed as part of the one or more first attachment members 10 and/or may be integrally formed as part of at least a portion of the second mechanism 8. Additionally, it is within the scope of this disclosure and as a non-limiting example that the one or more second joining members 20 may be integrally connected to at least a portion of the second mechanism 8 and/or to at last a portion of the first attachment member 10 by using one or more mechanical fasteners, one or more welds, one or more adhesives, an interference fit connection, a spline connection, a snap-fit type connection and/or a threaded connection. As a non-limiting example, the one or more second joining members 20 may be one or more gussets, one or more gusset plates and/or one or more brackets.

The one or more second attachment members 12 may have a first end portion 22 connected to at least a portion of the first mechanism 6 and a second end portion 24 connected to at least a portion of the second mechanism 8 of the first ladder rack assembly 3. It is within the scope of this disclosure and as a non-limiting example that the one or more second attachment members 12 may be integrally formed as part of the first and second mechanisms 6 and 8. Additionally, it is within the scope of this disclosure and as a non-limiting example that the one or more second attachment members 12 may be integrally connected to at least a portion of the first and second mechanisms 6 and 8 by using one or more mechanical fasteners, one or more welds, one or more adhesives, an interference fit connection, a spline connection, a snap-fit type connection and/or a threaded connection. Furthermore, it is within the scope of this disclosure and as a non-limiting example that at least a portion of the one or more first and/or second attachment members 10 and/or 12 may extend substantially perpendicular to at least a portion of the first and/or second mechanisms 6 and/or 8 of the ladder rack assembly 3.

In accordance with the embodiment illustrated in FIG. 1 and as a non-limiting example, the first ladder rack assembly 3 may include one or more third joining members 26. The one or more third joining members 26 may be used in order to aid in providing a rigid and secure connection between the one or more second attachment members 12 and the first mechanism 6 of the first ladder rack assembly 3. As best seen in FIG. 1 and as a non-limiting example, at least a portion of the one or more third joining members 26 may be connected to at least a portion of the first end portion 22 of the one or more second attachment members 12 and the first mechanism 6 of the first ladder, rack assembly 3. It is within the scope of this disclosure and as a non-limiting example that the one or more third joining members 26 may be integrally formed as part of the one or more second attachment members 12 and/or may be integrally formed as part of at least a portion of the first mechanism 6. Additionally, it is within the scope of this disclosure and as a non-limiting example that the one or more third joining members 26 may be integrally connected to at least a portion of the first mechanism 6 and/or to at last a portion of the second attachment member 12 by using one or more mechanical fasteners, one or more welds, one or more adhesives, an interference fit connection, a spline connection, a snap-fit type connection and/or a threaded connection. As a non-limiting example, the one or more third joining members 26 may be one or more gussets, one or more gusset plates and/or one or more brackets.

According to the embodiment illustrated in FIG. 1 of the disclosure and as a non-limiting example, the first ladder rack assembly 3 may include one or more fourth joining members 28. The one or more fourth joining members 28 may be used in order to aid in providing a rigid and secure connection between the one or more second attachment members 12 and the second mechanism 8 of the first ladder rack assembly 3. As best seen in FIG. 1 and as a non-limiting example, at least a portion of the one or more fourth joining members 28 may be connected to at least a portion of the second end portion 24 of the one or more second attachment members 12 and the second mechanism 8 of the first ladder rack assembly 3. It is within the scope of this disclosure and as a non-limiting example that the one or more fourth joining members 28 may be integrally formed as part of the one or more second attachment members 12 and/or may be integrally formed as part of at least a portion of the second mechanism 8. Additionally, it is within the scope of this disclosure and as a non-limiting example that the one or more fourth joining members 28 may be integrally connected to at least a portion of the second mechanism 8 and/or to at last a portion of the second attachment member 12 by using one or more mechanical fasteners, one or more welds, one or more adhesives, an interference fit connection, a spline connection, a snap-fit type connection and/or a threaded connection. As a non-limiting example, the one or more first fourth members 28 may be one or more gussets, one or more gusset plates and/or one or more brackets.

Figure 2:
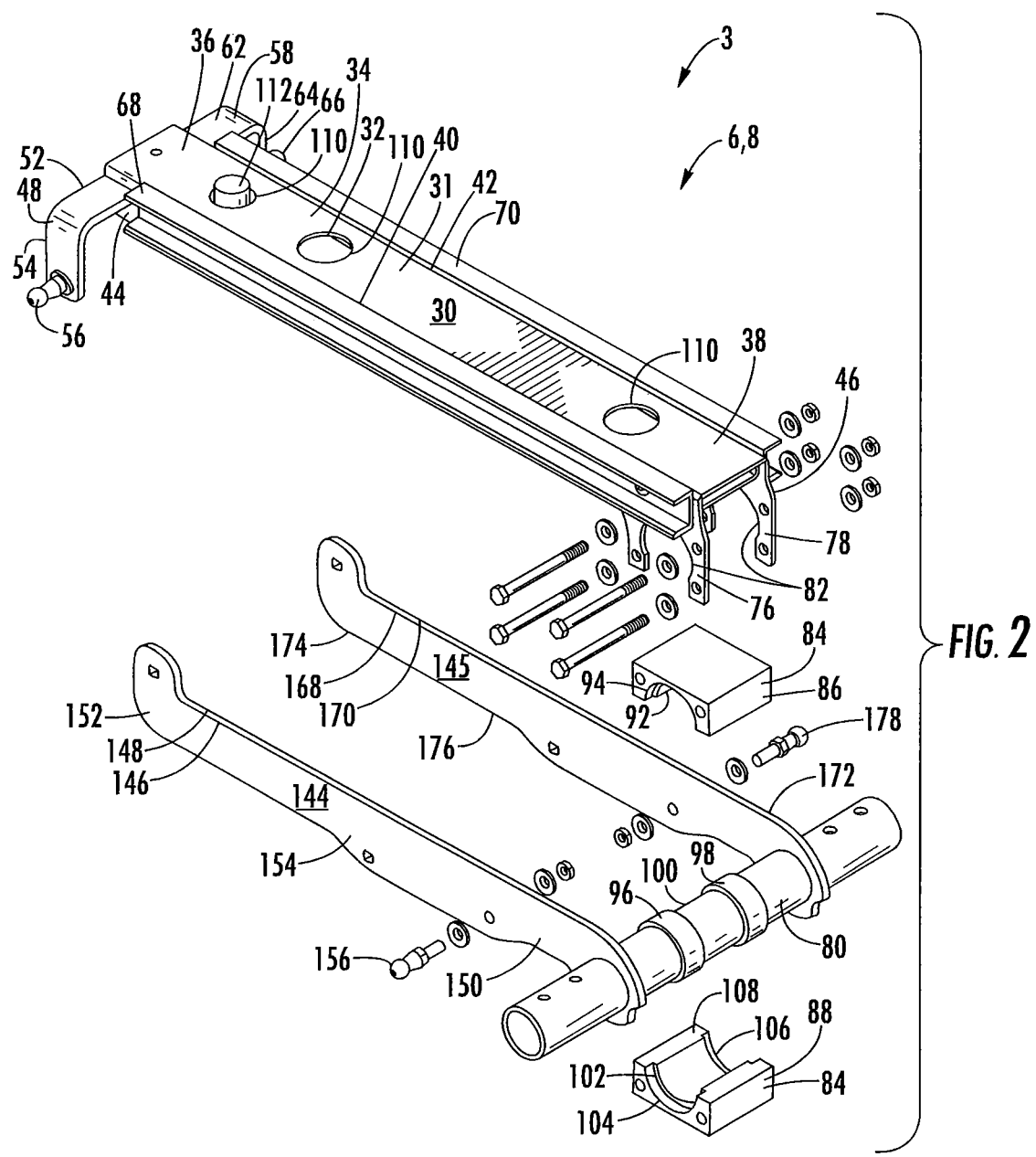
FIG. 2 is a schematic exploded perspective view of a portion of a mechanism of the ladder rack assembly illustrated in FIG. 1 of the disclosure.
Figure 3:
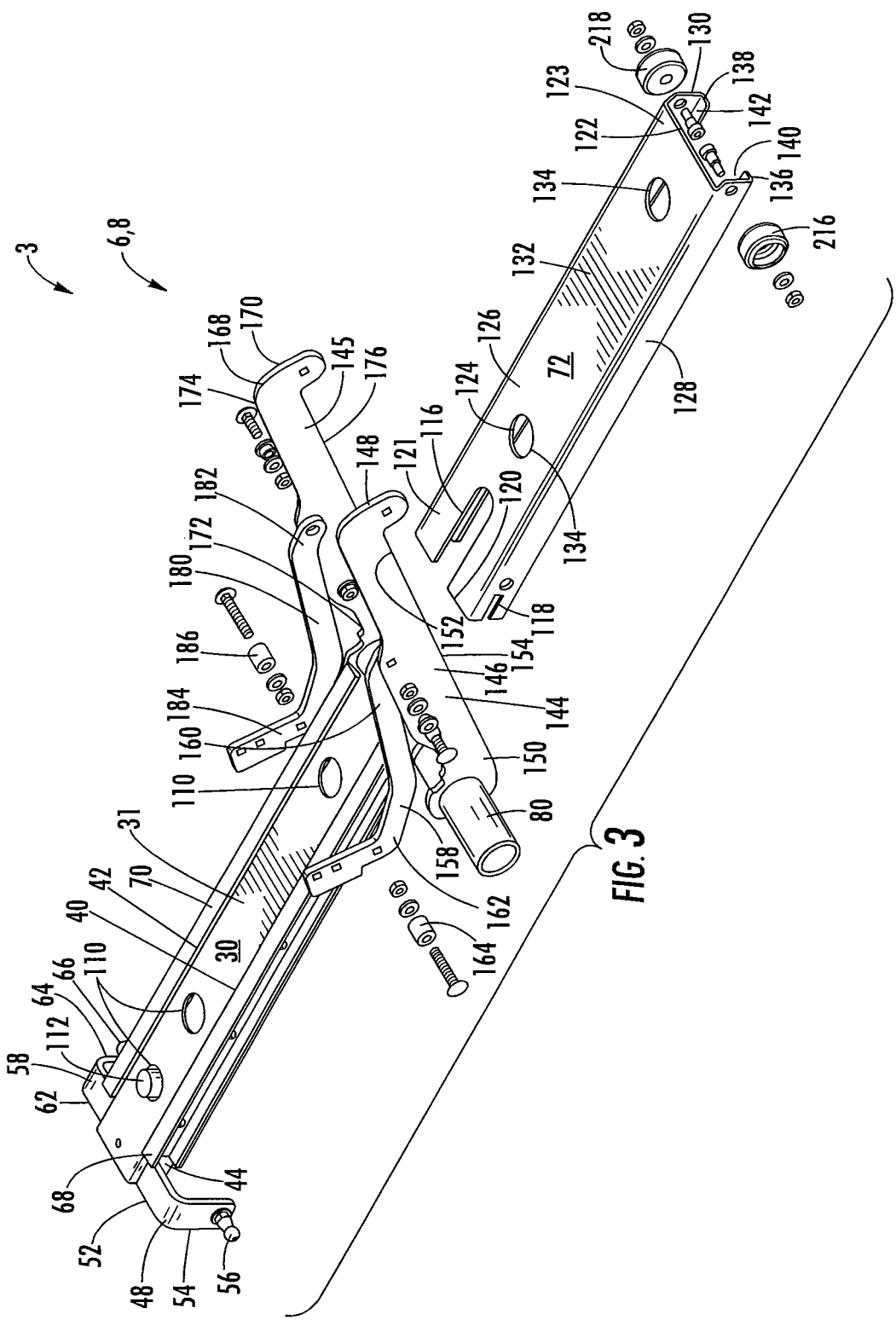
FIG. 3 is a schematic exploded perspective view of a portion of the mechanism of the ladder rack assembly illustrated in FIG. 2 of the disclosure.

As best seen in FIGS. 2 and 3 of the disclosure and as a non-limiting example, the first and second mechanism 6 and 8 of the first ladder rack assembly 3 may include a base member 30 having a central portion 31 with an inner surface 32, an outer surface 34, a first end portion 36, a second end portion 38, a first side 40 and a second side 42. In accordance with the embodiment illustrated in FIGS. 2 and 3 of the disclosure and as a non-limiting example, at least a portion of one or more first base member flanges 44 may extend outward from at least a portion of the first side 40 of the central portion 31 of the base member 30. It is within the scope of this disclosure and as a non-limiting example that at least a portion of one or more first base member flanges 44 may extend radially inward from at least a portion of the central portion 31 and may be disposed substantially perpendicular to at least a portion of the central portion 31 of the base member 30.

The base member 30 may include one or more second base member flanges 46 extending outward from at least a portion of the second side 42 of the central portion 31 of the base member 30. The one or more first and/or second base member flanges 44 and/or 46 may be used in order to provide structural support for the base member 30 and/or to provide a mounting surface for one or more additional components of the ladder rack assembly 3. It is within the scope of this disclosure and as a non-limiting example that at least a portion of the second base member flange 46 may extend radially inward from at least a portion of the central portion 31 and may be disposed substantially perpendicular to at least a portion of the central portion 31 of the base member 30. Additionally, it is within the scope of this disclosure and as a non-limiting example that at least a portion of the one or more first and second base member flanges 44 and 46 may extend substantially parallel to each other.

Figure 4:
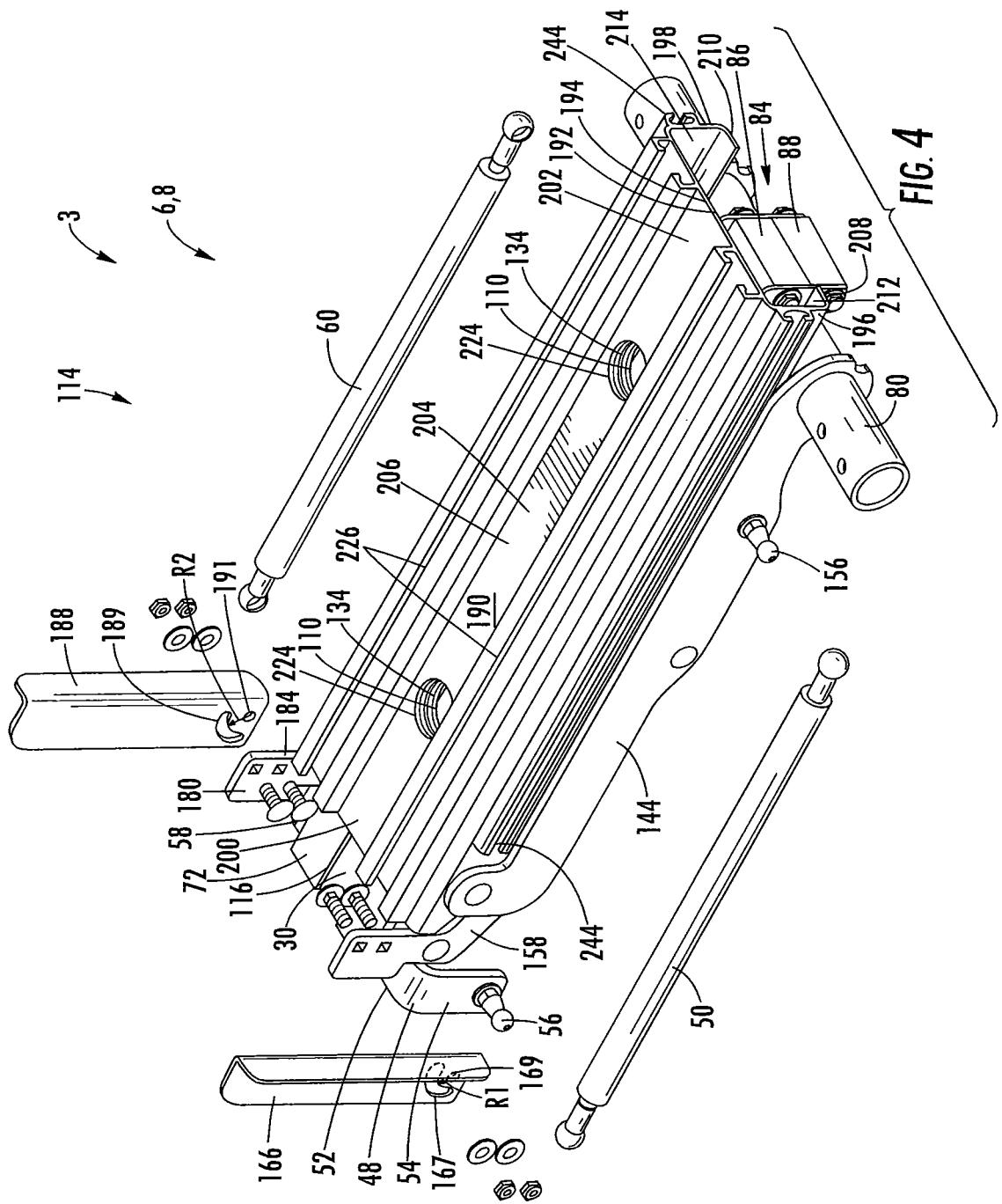
FIG. 4 is a schematic exploded perspective view of a portion of the mechanism of the ladder rack assembly illustrated in FIGS. 2 and 3 of the disclosure.

At least a portion of one or more first mounting members 48 may extend outward from at least a portion of the first end portion 36 of the base member 30. According to the embodiment illustrated in FIGS. 2-4 and as a non-limiting example, at least a portion of the one or more first mounting members 48 may extend outward from at least a portion of the one or more first base member flanges 44 of the base member 30. The one or more first mounting members 48 may provide a mounting surface for at least a portion of the one or more first assist members 50. The one or more first assist members 50 may be used to aid in allowing the one or more users (not shown) to quickly, easily, safely, and conveniently operate the ladder rack assembly 3. As best seen in FIGS. 2-4 of the disclosure and as a non-limiting example, the one or more first mounting members 48 may have an axially extending portion 52 and/or a radially extending portion 54. It is within the scope of this disclosure and as a non-limiting example that at least a portion of the axially extending portion 52 may extend substantially perpendicular to at least a portion of the radially extending portion 54 of the one or more first mounting members 48.

In accordance with the embodiment illustrated in FIGS. 2-4 of the disclosure and as a non-limiting example, at least a portion of one or more first ball studs 56 may be connected to at least a portion of the one or more first mounting members 48. The one or more first ball studs 56 may provide a mounting surface for at least a portion of the one or more first assist members 50. Once attached, the end of the one or more first assist members 50 attached to the one or more first ball studs 56 may be fixedly secured thereto while still allowing the end of the one or more first assist members 50 to rotate with respect to the one or more first ball studs 56. According to the embodiment illustrated in FIGS. 2-4 and as a non-limiting example, at least a portion of the one or more first ball studs 56 may be connected to at least a portion of the radially extending portion 54 of the one or more first mounting members 48. As a non-limiting example, at least a portion of the one or more first ball studs 56 may be integrally formed as part of the one or more first mounting members 48 or integrally connected to at least a portion of the one or more first mounting members 48 as a separate component. It is within the scope of this disclosure and as a non-limiting example that the one or more first ball studs 56 may be connected to the one or more first mounting members 48 by using one or more welds, one or more adhesives, one or more mechanical fasteners, a threaded connection, a spline connection and/or an interference connection.

At least a portion of one or more second mounting members 58 may extend outward from at least a portion of the first end portion 36 of the base member 30 of the ladder rack assembly 3. According to the embodiment illustrated in FIGS. 2-4 and as a non-limiting example, at least a portion of the one or more second mounting members 58 may extend outward from at least a portion of the one or more second base member flanges 46 of the base member 30. The one or more second mounting members 58 may provide a mounting surface for at least a portion of the one or more second assist members 60. The one or more second assist members 60 may be used to aid in allowing the one or more users (not shown) to quickly, easily, safely, and conveniently operate the ladder rack assembly 3. As best seen in FIGS. 2 and 3 of the disclosure and as a non-limiting example, the one or more second mounting members 58 may have an axially extending portion 62 and/or a radially extending portion 64. It is within the scope of this disclosure and as a non-limiting example that at least a portion of the axially extending portion 62 may extend substantially perpendicular to at least a portion of the radially extending portion 64 of the one or more second mounting members 58. Additionally, it is within the scope of this disclosure and as a non-limiting example that the one or more first and/or second assist members 50 and/or 60 may be one or more dampers, one or more hydraulic dampers, one or more pneumatic dampers, one or more hydraulic cylinders, one or more pneumatic cylinders, one or more gas springs and/or any other similar type of device.

According to the embodiment illustrated in FIGS. 2-4 and as a non-limiting example, at least a portion of one or more second ball studs 66 may be connected to at least a portion of the one or more second mounting members 58. The one or more second ball studs 66 may provide a mounting surface for at least a portion of the one or more second assist members 60. Once attached, the end of the one or more second assist members 60 attached to the one or more second ball studs 66 may be fixedly secured thereto while still allowing the end of the one or more second assist members 60 to rotate with respect to the one or more second ball studs 66. According to the embodiment illustrated in FIGS. 2 and 3 and as a non-limiting example, at least a portion of the one or more second ball studs 66 may be connected to at least a portion of the radially extending portion 64 of the one or more second mounting members 58. As a non-limiting example, at least a portion of the one or more second ball studs 66 may be integrally formed as part of the one or more second mounting members 58 or integrally connected to at least a portion of the one or more second mounting members 58 as a separate component. It is within the scope of this disclosure and as a non-limiting example that the one or more second ball studs 66 may be connected to the one or more second mounting members 58 by using one or more welds, one or more adhesives, one or more mechanical fasteners, a threaded connection, a spline connection and/or an interference connection.

It is within the scope of this disclosure and as a non-limiting example that the one or more first and/or second mounting members 48 and/or 58 may be integrally formed as part of the base member 30 or integrally connected to at least a portion of the base member 30 as one or more separate components. As a result, the one or more first and/or second mounting members 48 and/or 58 may be integrally connected to at least a portion of the base member 30 by using one or more welds, one or more adhesives, one or more mechanical fasteners, a threaded connection, a spline connection and/or an interference fit connection.

Additionally, it is within the scope of this disclosure and as a non-limiting example that the one or more first and second mounting members 48 and 58 may form a single unitary component that is separate from and integrally connected to at least a portion of the base member 30.

A first slide rail 68 and/or a second slide rail 70 may be connected to at least a portion of the base member 30. The first and/or second slide rail 68 and/or 70 may be used to aid in selectively translating a sliding member 72 linearly relative to the stationary base member 30 of the ladder rack assembly 3. The first slide rail 68 and/or a second slide rail 70 may be of a size and shape needed to receive and/or retain at least a portion of one or more rolling elements (not shown) therein. It is to be understood that the one or more rolling elements (not shown) may be used to aid in allowing the sliding member 72 to smoothly and easily translate linearly relative to the base member 30. At least a portion of the one or more sliding members (not shown) may be connected to at least a portion of sliding member 72 of the ladder rack assembly 3. In accordance with the embodiment illustrated in FIGS. 2 and 3 of the disclosure and as a non-limiting example, at least a portion of the first slide rail 68 may be connected to at least a portion of the one or more first base member flanges 44 and at least a portion of the second slide rail 70 may be connected to at least a portion of the one or more second base member flanges 46. It is within the scope of this disclosure and as a non-limiting example that the first slide rail 68 and/or a second slide rail 70 may be integrally formed as part of the base member 30 or integrally connected to at least a portion of the base member 30 as a separate components. As a result, it is within the scope of this disclosure and as a non-limiting example that the first slide rail 68 and/or a second slide rail 70 may be integrally connected to at least a portion of the base member 30 by using one or more welds, one or more adhesives, one or more mechanical fasteners, a spline connection and/or an interference fit connection.

At least a portion of one or more third mounting members 76 and/or one or more fourth mounting members 78 may be connected to and extend outward from at least a portion of the second end portion 38 of the base member 30. The one or more third and/or fourth mounting members 76 and/or 78 may be used to fixedly secure at least a portion of the base member 30 to at least a portion of one or more first shafts 80. As best seen in FIG. 2 and as a non-limiting example, at least a portion of the one or more third and fourth mounting members 76 may extend radially inward from at least a portion of an end of the one or more first and second base member flanges 44 and 46 respectively, opposite the central portion 31. Additionally, as best seen in FIG. 2 and as a non-limiting example at least a portion of the one or more third and fourth mounting members 76 and 78 may be substantially extend substantially parallel to each other and the one or more third and/or fourth mounting members 76 and/or 78 of the base member 30. It is within the scope of this disclosure and as a non-limiting example that the one or more third and/or fourth mounting members 76 and/or 78 may be integrally formed as part of the base member 30 or integrally connected to at least a portion of the base member 30 as a separate component. As a result, it is within the scope of this disclosure and as a non-limiting example that at the one or more third and/or fourth mounting members 76 and/or 78 may be integrally connected to the base member 30 by using one or more welds, one or more adhesives, one or more mechanical fasteners, a threaded connection, a spline connection and/or an interference fit connection.

The one or more third and/or fourth mounting members 76 and/or 78 of the base member 30 may have one or more receiving portions 82 therein respectively. The one or more receiving portions 82 in the one or more third and/or fourth mounting members 76 and/or 78 may be of a size and shape to receive and/or retain at least a portion of the one or more first shafts 80 therein. It is within the scope of this disclosure and as a non-limiting example that the one or more first shafts 80 may be allowed to rotate within the one or more receiving portions 82 in the one or more third and/or fourth mounting members 76 and/or 78 of the base member 30. As a result, it is therefore to be understood that the one or more receiving portions 82 aid in securing at least a portion of the base member 30 to at least a portion of the one or more first shafts 80 of the ladder rack assembly 3. It is within the scope of this disclosure and as a non-limiting example that the one or more first shafts 80 may be drivingly connected to at least a portion of one or more sources of rotational power 254. As a non-limiting example, the one or more sources' of rotational power 254 may be one or more motors, one or more electric motors, one or more ratchet assemblies, one or more lever assemblies, one or more pulley assemblies, one or more chain drive assemblies, one or more rods, one or more poles, one or more shafts, one or more levers, and/or one or more gear assemblies in order to provide the rotational energy needed to selectively rotate the one or more first shafts 80 of the ladder rack assembly 3.

In order to provide and ensure that a secure connection between the base member 30 and the one or more first shafts 80, one or more bushing members 84 may be used. As best seen in FIG. 2 of the disclosure and as a non-limiting example, the one or more bushing members 84 may include a first portion 86 and a second portion 88. While the one or more bushing members 84 illustrated in FIG. 2 are illustrated as being two separable components, it is within the scope of this disclosure and as a non-limiting example that the first portion 86 and the second portion 88 of the one or more bushing members 84 may form a single unitary piece. As a non-limiting example, at least a portion of the first portion 86 and the second portion 88 of the one or more bushing members 84 may be interposed between the one or more third and fourth mounting members 76 and 78 of the base member 30. It is within the scope of this disclosure and as a non-limiting example that at least a portion of the first portion 86 and the second portion 88 of the one or more bushing members 84 may be integrally connected to at least a portion of the one or more third and/or fourth mounting members 76 and/or 78 by using one or more welds, one or more adhesives, a threaded connection, a spline connection and/or an interference fit connection.

One or more first receiving portions 92, one or more second receiving portions 94 and/or one or more third receiving portions (not shown) may extend inward from at least a portion of an outer surface 90 of the first portion 86 of the one or more bushing members 84. The one or more first receiving portions 92 of the first portion 86 of the one or more bushing members 84 may be of a size and shape to receive and/or retain at least a portion of the one or more first shafts 80 therein. Additionally, the one or more second receiving portions 94 and/or the one or more third receiving portions (not shown) in the first portion 86 of the one or more bushing members 84 may be of a size and shape to receive and/or retain at least a portion of one or more first increased diameter portions 96 and one or more second increased diameter portions 98 respectively. As best seen in FIG. 2 and as a non-limiting example, the one or more first and second increased diameter portions 96 and 98 may extend outward from at least a portion of an outer surface 100 of the one or more first shafts 80 of the ladder rack assembly 3.

One or more fourth receiving portions 102, one or more fifth receiving portions 104 and/or one or more sixth receiving portions 106 may extend inward from at least a portion of an outer surface 108 of the second portion 88 of the one or more bushing members 84. The one or more fourth receiving portions 102 of the second portion 86 of the one or more bushing members 84 may be of a size and shape to receive and/or retain at least a portion of the one or more first shafts 80 therein. Additionally, the one or more fifth and sixth receiving portions 104 and 106 in the second portion 88 of the one or more bushing members 84 may be of a size and shape to receive and/or retain at least a portion of the one or more first and second increased diameter portions 96 and 98 on the outer surface 100 of the one or more first shafts 80 respectively. The interaction between the one or more first receiving portions 92, the one or more second receiving portions 94, the one or more third receiving portions (not shown), the one or more fourth receiving portions 102, the one or more fifth receiving portions 104, the one or more sixth receiving portions 106, the first increased diameter portion 96 and/or the second increased diameter portion 98 aid in preventing the one or more first shafts 80 from sliding back and forth relative to the one or more bushing members 84. While the one or more first shafts 80 are restrained from sliding back-and-forth by the interaction between the one or more bushing members 84 and the one or more first shafts 80, the one or more first shafts 80 may be allowed to rotate within the one or more bushing members 84 when in operation.

At least a portion of one or more third attaching members 81 having a first end portion 83 and a second end portion 85 may be axially and/or radially off-set from at least a portion of the one or more second attaching members 12 of the ladder rack assembly 3. As best seen in FIG. 1 of the disclosure and as a non-limiting example, at least a portion of the first end portion 83 of the one or more third attaching members 81 may be connected to at least a portion of an end of the one or more first shafts 80 of the first mechanism 6. The one or more third attaching members 81 may be used to transfer the rotational energy from the one or more first shafts 80 of the first mechanism 6 to the one or more first shafts 80 of the second mechanism 8 of the ladder rack assembly 3. Additionally, as best seen in FIG. 1 and as a non-limiting example, at least a portion of the second end portion 85 of the one or more third attaching members 81 may be connected to at least a portion of an end of the one or more first shafts 80 of the second mechanism 8 of the ladder rack assembly 3. It is within the scope of this disclosure and as a non-limiting example that at least a portion of the one or more third attaching members 81 may be integrally formed as part of the one or more first shafts 80 or connected to at least a portion of the one or more first shafts 80 of the first and second mechanisms 6 and 8 as one or more separate components. As a result, it is within the scope of this disclosure and as a non-limiting example, that the one or more third attaching members 81 may be integrally connected to the one or more first shafts 80 by using one or more welds, one or more adhesives, one or more mechanical fasteners, a threaded connection, a spline connection and/or an interference fit connection.

In accordance with the embodiment illustrated in FIGS. 2-4 of the disclosure and as a non-limiting example, the central portion 31 of the base member 30 may have one or more base member apertures 110 extending from the inner surface 32 to an outer surface 34 thereof. The one or more base member apertures 110 in the central portion 31 of the base member 30 may aid in assembling the ladder rack assembly 3, may aid in reducing the overall weight of the ladder rack assembly 3, and/or may aid in reducing the overall costs associated with the ladder rack assembly 3.

As best seen in FIGS. 2 and 3 of the disclosure and as a non-limiting example, one or more of the one or more base member apertures 110 in the base member 30 may be of a size and shape to receive and/or retain at least a portion of one or more first bumper members 112 therein. When the first and second mechanisms 6 and 8 are in the first position 114 illustrated in FIGS. 1, 4, 5, 5A and 5B of the disclosure, at least a portion of the sliding member 72 may be in direct contact with at least a portion of the one or more first bumper members 112. This interaction between the one or more first bumpers 112 and the sliding member 72 aids in reducing the overall harshness associated with selectively transitioning the one or more ladders 5 and the ladder rack assembly 3 to the first position 114 (the stored position and/or the transporting position). As a result, this aids in increasing the overall life and durability of the ladder rack assembly 3 and reduces the over amount of wear and tear that the ladder rack assembly 3 imposed on the vehicle 2.

According to the embodiment illustrated in FIG. 3 of the disclosure and as a non-limiting example, the sliding member 72 may include a first end 120, a second end 122, a first end portion 121, a second end portion 123, an inner surface 124, an outer surface 126, a first side portion 128, a second side portion 130 and/or a central top portion 132. At least a portion of the first and second side portions 128 and 130 of the sliding member 72 may extend radially inward from and substantially perpendicular to at least a portion of the central top portion 132 of the sliding member 72. Additionally, as best seen in FIG. 3 of the disclosure and as a non-limiting example at least a portion of the first side portion 128 may extend substantially parallel to at least a portion of the second side portion 130 of the sliding member 72. The first side portion 128. It is within the scope of this disclosure and as a non-limiting example that the first and second side members 128 and 130 may be substantially continuous along a length of the sliding member 72 or may be separated into one or more segments along the length of the sliding member 72.

The sliding member 72 may include one or more first cut-out portions 116, one or more second cut-out portions 118 and/or one or more third cut-out portions (not shown). As best seen in FIG. 3 of the disclosure and as a non-limiting example, the one or more first cut-out portions 116 may extend inward from at least a portion of the first end 120 of the sliding member 72 into the central top portion 132 of the sliding member 72. The one or more first cut-out portions 116 may be of a size and shape to receive at least a portion of the one or more first bumper members 112 as the ladder rack assembly 3 is being translated back into the first position 114. Additionally, as best seen in FIG. 3 of the disclosure and as a non-limiting example, the one or more second cut-back portions 118 and the one or more third cut-back portions (not shown) may extend inward into the first side portion 128 and the second side portion 130 respectively from the first end 120 of the sliding member 72. The one or more second cut-back portions 118 and the one or more third cut-back portions (not shown) may be of a side and shape to receive at least a portion of the one or more first mounting members 48 and the one or more second mounting members 58 respectively as the ladder rack assembly 3 is being translated back into the first position 114. Additionally, the one or more second cut-back portions 118 and the one or more third cut-back portions (not shown) may aid in locking the sliding member 72 radially in place relative to the base member 30. This aids in reducing the overall amount of movement and sound(s) associated with the ladder rack assembly 3 when in the first position 114 and being transported by the vehicle 2.

One or more sliding member apertures 134 may extend from the inner surface 124 to the outer surface 126 of the central top portion 132 of the sliding member 72. As best seen in FIG. 4 of the disclosure and as a non-limiting example, the one or more sliding member apertures 134 may be aligned with the one or more base member apertures 110 when the ladder rack assembly 3 is in the first position 114. The one or more sliding member apertures 134 in the central top portion 132 of the sliding member 72 may aid assembling the ladder rack assembly 3, may aid in reducing the overall weight of the ladder rack assembly 3, and/or may aid in reducing the overall costs associated with the ladder rack assembly 3.

As best seen in FIG. 3 of the disclosure and as a non-limiting example, the sliding member 72 may include one or more first sliding member flanges 136 and/or one or more second sliding member flanges 138. The one or more first and second sliding member flanges 136 and 138 may extend inward from at least a portion of an end of the first and second side portions 128 and 130 respectively, opposite the central top portion 132 of the sliding member 72. In accordance with the embodiment illustrated in FIG. 3 and as a non-limiting example, at least a portion of the one or more first and second sliding member flanges 136 and 138 may extend substantially perpendicular to the first and second side portions 128 and 130 of the sliding member 132. Additionally, as illustrated in FIG. 3 of the disclosure and as a non-limiting example, at least a portion of the one or more first and second sliding member flanges 136 and 138 may extend substantially parallel to the central top portion 132 of the sliding member 72. As a result, the one or more first and second sliding member flanges 136 and 138 aid in defining a first sliding member space 140 and a second sliding member space 142 within the sliding member 72. The first and second slider member spaces 140 and 142 may be of a size and shape to receive and/or retain at least a portion of the first and second slide rail 68 and/or 70 therein. This aids in retaining the sliding member 72 relative to the base member 30 while still allowing the sliding member 72 to selectively slide linearly relative to the base member 30 when the ladder rack assembly 3 is in operation.

In accordance with the embodiment illustrated in FIGS. 2-4 of the disclosure and as a non-limiting example, at least a portion of one or more first drive members 144 and/or one or more second drive members 145 may be connected to at least a portion of the one or more first shafts 80 of the ladder rack assembly 3. The one or more first and/or second drive members 144 and/or 145 may be used in order to transfer the rotational energy from the one or more first shafts 80 to the first and/or second mechanisms 6 and/or 8 of the ladder rack assembly 3. According to the embodiment illustrated in FIGS. 2 and 3 of the disclosure and as a non-limiting example, at least a portion of the one or more first and second drive members 144 and 145 may be disposed on opposing sides of the sliding member 72. It is therefore to be understood that at least a portion of the one or more first drive members 144 may be disposed outboard from an end of the one or more first increased diameter portions 96, opposite the one or more second increased diameter portions 98. Additionally, it is therefore to be understood that at least a portion of the one or more second drive members 145 may be disposed outboard from an end of the one or more second increased diameter portions 98, opposite the one or more first increased diameter portions 96. This may aid in ensuring that the first and/or second mechanisms 6 and/or 8 operate smoothly, reliably, easily and avoid any binding that may otherwise occur between the various parts and components of the first and/or second mechanisms 6 and/or 8 of the ladder rack assembly 3.

The one or more first drive members 144 may have a first side 146, a second side 148, a first end portion 150, a second end portion 152, and an intermediate portion 154 interposed between the first and second end portions 150 and 152 of the one or more first drive members 144. At least a portion of the first end portion 150 of the one or more first drive members 144 may be integrally formed as part of the one or more first shafts 80 or integrally connected to at least a portion of the one or more first shafts 80 as a separate component. As a non-limiting example, the first end portion 150 of the one or more first drive members 144 may be connected to the one or more first shafts 80 by using one or more welds, one or more adhesives, one or more mechanical fasteners, a threaded connection, a spline connection and/or an interference fit connection.

At least a portion of one or more third ball studs 156 may be connected to at least a portion of the intermediate portion 154 of the one or more first drive members 144. The one or more third ball studs 156 may provide a mounting surface for at least a portion of an end of the one or more first assist members 50 opposite the one or more first ball studs 56. Once attached, the end of the one or more first assist members 50 attached to the one or more third ball studs 156 may be fixedly secured thereto while still allowing the end of the one or more first assist members 50 to rotate with respect to the one or more third ball studs 156. As a non-limiting example, at least a portion of the one or more third ball studs 156 may be integrally formed as part of the one or more first drive members 144 or integrally connected to at least a portion of the one or more first drive members 144 as a separate component. It is within the scope of this disclosure and as a non-limiting example that the one or more third ball studs 156 may be connected to the one or more first drive members 144 by using one or more welds, one or more adhesives, one or more mechanical fasteners, a threaded connection, a spline connection and/or an interference connection.

Figure 6:
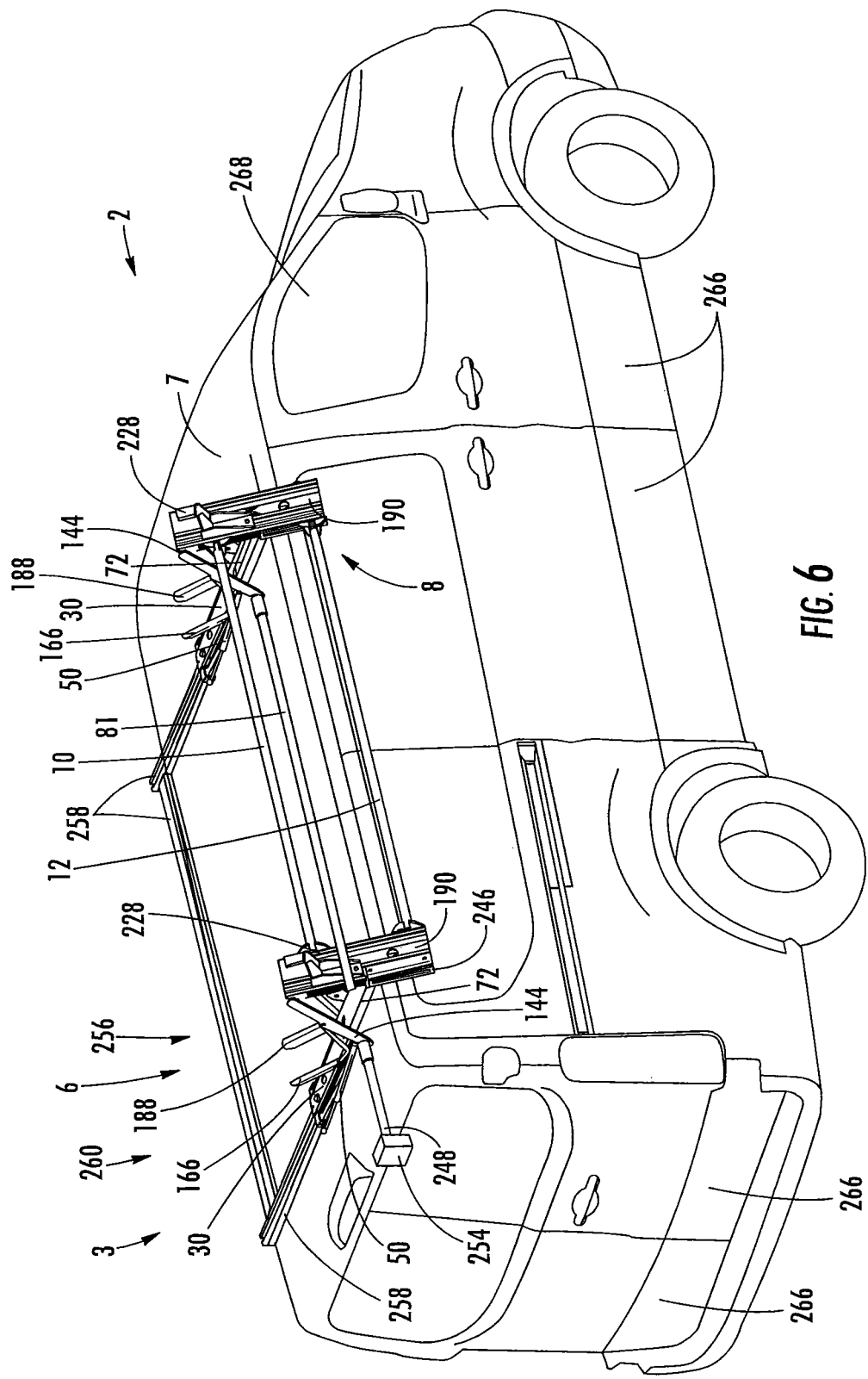
FIG. 6 is a schematic perspective view of the vehicle and the ladder rack assembly illustrated in FIGS. 1-5B of the disclosure where the ladder rack assembly is in a second position.
Figure 6A:
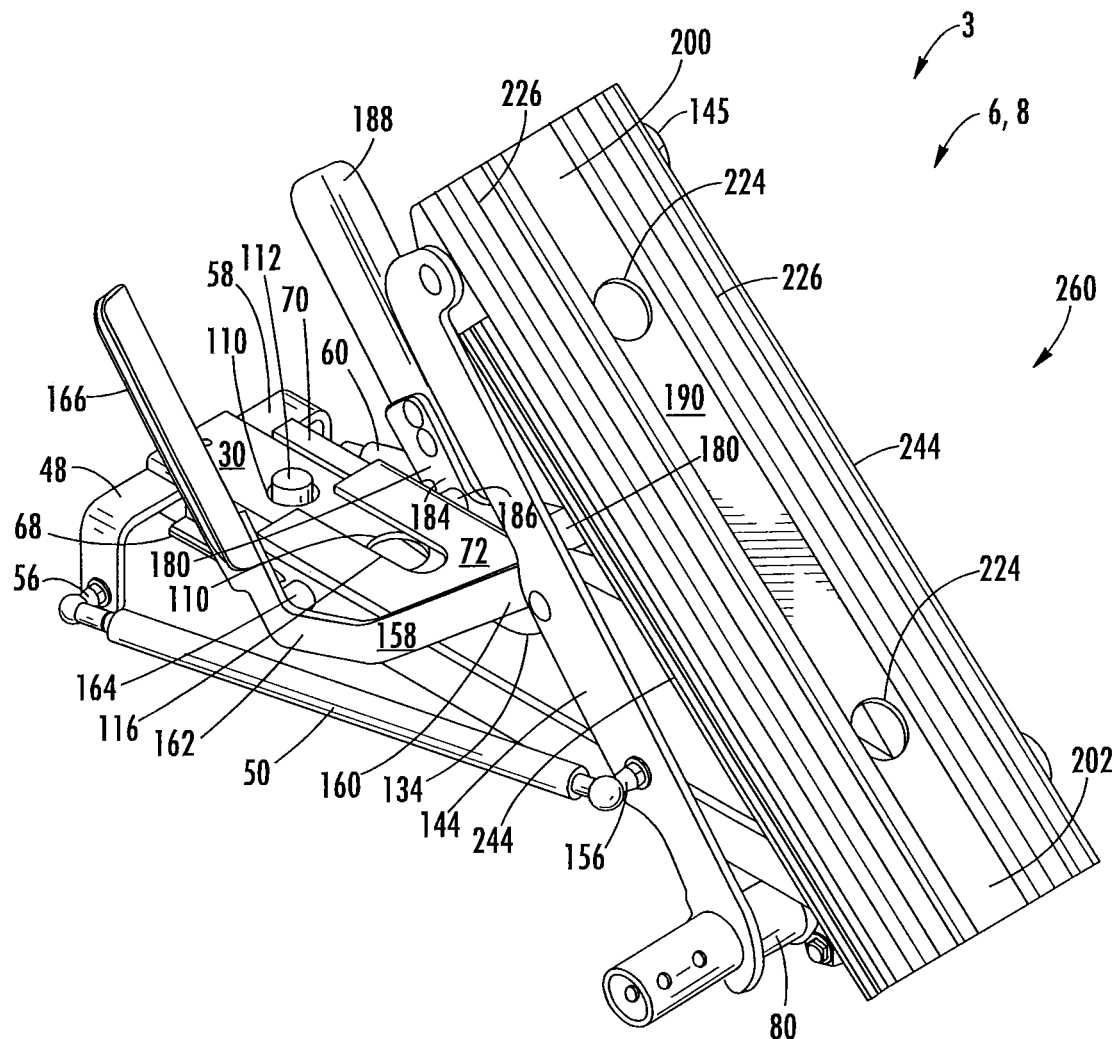
FIG. 6A is a schematic perspective view of a portion of the mechanism of the ladder rack assembly illustrated in FIGS. 1-6 where the mechanism is in the second position illustrated in FIG. 6 of the disclosure.
Figure 6B:
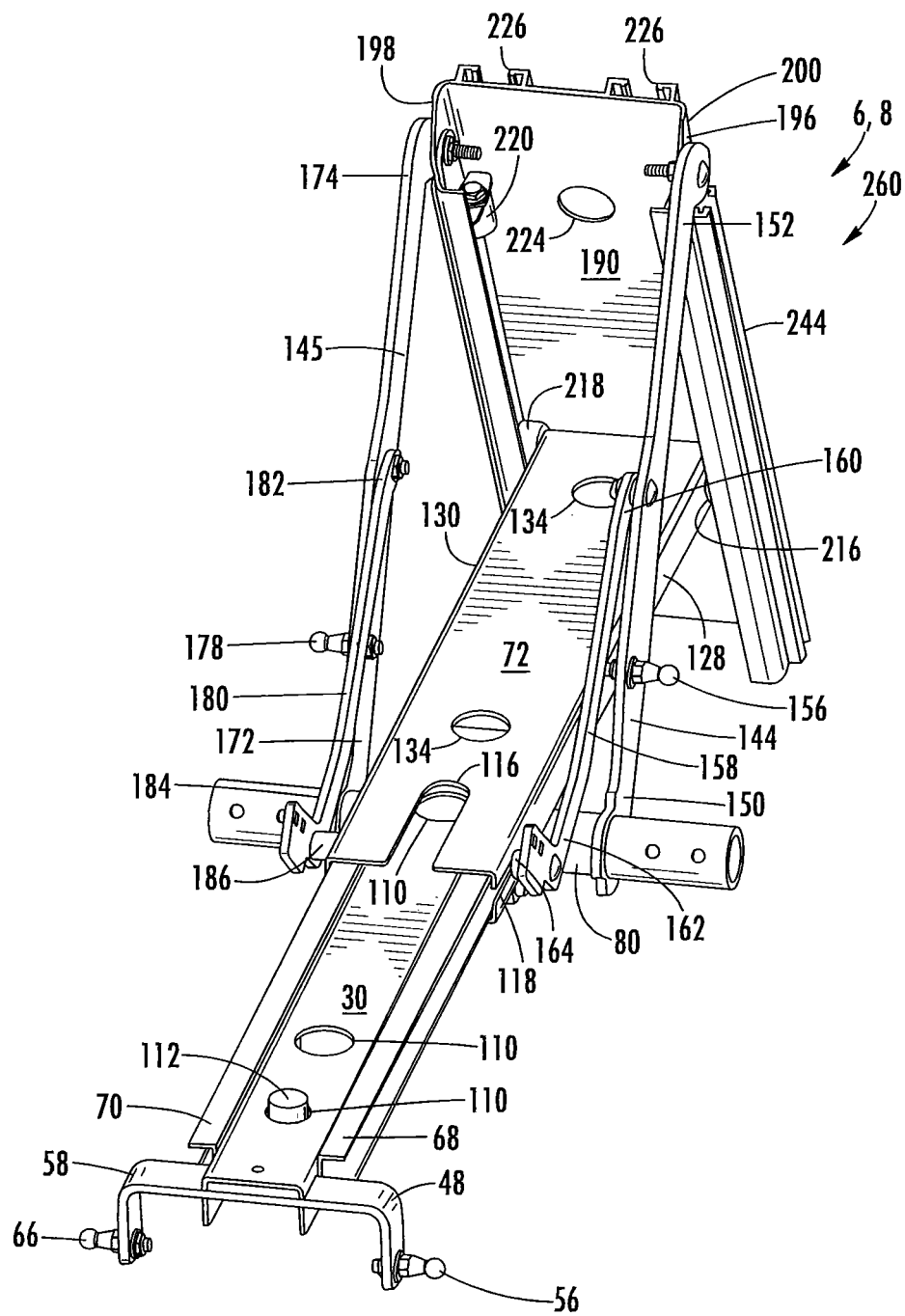
FIG. 6B is a schematic perspective rear view of the mechanism of the ladder rack assembly illustrated in FIGS. 1-6A where the mechanism is in the second position illustrated in FIGS. 6 and 6A.

One or more first linkage members 158 may be used in order to connect at least a portion of the one or more first drive members 144 to at least a portion of the sliding member 72. As illustrated in FIGS. 6A, 6B and 7A and as a non-limiting example, the one or more first linkage members 158 may aid in translating the rotational energy from the one or more first shafts 80 and the one or more first drive members 144 to the sliding member 72. It is therefore to be understood that this aids in allowing the one or more first shafts 80 to selectively translate or drive the sliding member 72 linearly relative to the base member 30 of the ladder rack assembly 3. As best seen in FIGS. 3, 6A, 6B and 7A and as a non-limiting example, the one or more first linkage members 158 may have a first end portion 160 and a second end portion 162. At least a portion of the first end portion 158 of the one or more first linkage members 158 may be integrally and/or pivotably connected to at least a portion of the intermediate portion 154 of the one or more first drive members 144. Additionally, at least a portion of the second end portion 162 of the one or more first linkage members 158 may be integrally and/or pivotably connected to at least a portion of the first end portion 121 of the sliding member 72.

In order to provide a secure connection between the one or more first linkages 158 and the sliding member 72, one or more first spacers 164 may be used. The one or more first spacers 164 may also act like a bushing member in order to reduce the overall amount of friction between the one or more first linkages 158 and the sliding member 72 when the ladder rack assembly 3 in in operation. As best seen in FIGS. 6, 6A and 7A of the disclosure and as a non-limiting example, at least a portion of the at least a portion of the one or more first spacers 164 may be interposed between the one or more first linkages 158 and the first side portion 128 of the sliding member 72. As a non-limiting example, the one or more first spacers 164 may be integrally formed as part of the one or more first linkages 158 and/or the sliding member 72 or may be connected to at least a portion of the one or more first linkages 158 and/or the sliding member 72 as one or more separate components. It is within the scope of this disclosure and as a non-limiting example that the one or more first spacers 164 may be connected to the one or more first linkages 158 and/or the sliding member 72 by using one or more welds, one or more adhesives, one or more mechanical fasteners, a threaded connection, a spline connection and/or an interference fit connection.

At least a portion of one or more first arms 166 may be connected to at least a portion of the second end portion 162 of the one or more first linkages 158. The one or more first arms 166 may provide a positive stop for at least a portion of the one or more ladders 5 and may aid in securing at least a portion of the one or more ladders 5 to at least a portion of the ladder rack assembly 3. It is within the scope of this disclosure and as a non-limiting example that the one or more first arms 166 may be integrally formed as part of the one or more first linkages 158 or may be integrally connected to at least a portion of the one or more first linkages 158 as one or more separate components. As a non-limiting example, the one or more first arms 166 may be connected to the one or more first linkages 158 by using one or more welds, one or more adhesives, one or more mechanical fasteners, a threaded connection, a spline connection and/or an interference connection.

According to the embodiment where the one or more first arms 166 are a separate component from the one or more first linkages 158, the one or more first arms 166 may include one or more first mounting apertures 167 and/or one or more second mounting apertures 169 therein. The one or more first and/or second mounting apertures 167 and/or 169 may be of a size and shape to receive and/or retain at least a portion of one or more mechanical fasteners therein. As best seen in FIG. 4 and as a non-limiting example, at least a portion of the one or more first apertures 167 may be substantially arcuate in shape and/or may have a substantially continuous radius R1 from a theoretical center of the one or more second mounting apertures 169 in the one or more first arms 166 of the ladder rack assembly 3. By providing the one or more first apertures 167 with a substantially arcuate shape, it may allow the one or more first arms 166 to be selectively rotated downward toward the base member 30 and the sliding member 72 until the they are substantially flat or substantially parallel to the base member 30 and the sliding member 72. As a result, when the ladder rack assembly 3 is in the first position 114 and installed on the vehicle 2 for transport, the ladder rack assembly 3 may be in its most compact form factor allowing both the vehicle 2 and the ladder rack assembly 3 installed thereon to fit within a rail car (not shown). Additionally, by providing the one or more first apertures 167 with a substantially arcuate shape, it may allow the one or more first arms 166 to be selectively rotated a pre-determined amount as needed to allow the one or more ladders 5 to be installed onto or removed from the ladder rack assembly 3.

The one or more second drive members 145 may have a first side 168, a second side 170, a first end portion 172, a second end portion 174, and an intermediate portion 176 interposed between the first and second end portions 172 and 174 of the one or more second drive members 145. At least a portion of the first end portion 172 of the one or more second drive members 145 may be integrally formed as part of the one or more first shafts 80 or integrally connected to at least a portion of the one or more first shafts 80 as a separate component. As a non-limiting example, the first end portion 172 of the one or more second drive members 145 may be connected to the one or more first shafts 80 by using one or more welds, one or more adhesives, one or more mechanical fasteners, a threaded connection, a spline connection and/or an interference fit connection.

At least a portion of one or more fourth ball studs 178 may be connected to at least a portion of the intermediate portion 176 of the one or more second drive members 145. The one or more fourth ball studs 178 may provide a mounting surface for at least a portion of an end of the one or more second assist members 60 opposite the one or more second ball studs 66. Once attached, the end of the one or more second assist members 60 attached to the one or more fourth ball studs 178 may be fixedly secured thereto while still allowing the end of the one or more second assist members 60 to rotate with respect to the one or more fourth ball studs 178. As a non-limiting example, at least a portion of the one or more fourth ball studs 178 may be integrally formed as part of the one or more second drive members 145 or integrally connected to at least a portion of the one or more second drive members 145 as a separate component. It is within the scope of this disclosure and as a non-limiting example that the one or more fourth ball studs 178 may be connected to the one or more second drive members 145 by using one or more welds, one or more adhesives, one or more mechanical fasteners, a threaded connection, a spline connection and/or an interference connection.

One or more second linkage members 180 may be used in order to connect at least a portion of the one or more second drive members 145 to at least a portion of the sliding member 72. As illustrated in FIGS. 6A, 6B and 7A and as a non-limiting example, the one or more second linkage members 180 may aid in translating the rotational energy from the one or more first shafts 80 and the one or more second drive members 145 to the sliding member 72. It is therefore to be understood that this aids in allowing the one or more first shafts 80 to selectively translate or drive the sliding member 72 linearly relative to the base member 30 of the ladder rack assembly 3. As best seen in FIGS. 3, 6A, 6B and 7A and as a non-limiting example, the one or more second linkage members 180 may have a first end portion 182 and a second end portion 184. At least a portion of the first end portion 182 of the one or more second linkage members 180 may be integrally and/or pivotably connected to at least a portion of the intermediate portion 176 of the one or more second drive members 145. Additionally, at least a portion of the second end portion 184 of the one or more second linkage members 180 may be integrally and/or pivotably connected to at least a portion of the first end portion 121 of the sliding member 72 of the ladder assembly 3.

In order to provide a secure connection between the one or more second linkages 180 and the sliding member 72, one or more second spacers 186 may be used. The one or more second spacers 186 may also act like a bushing member in order to reduce the overall amount of friction between the one or more second linkages 180 and the sliding member 72 when the ladder rack assembly 3 in in operation. As best seen in FIGS. 6, 6A and 7A of the disclosure and as a non-limiting example, at least a portion of the one or more second spacers 186 may be interposed between the one or more second linkages 180 and the second side portion 130 of the sliding member 72. As a non-limiting example, the one or more second spacers 186 may be integrally formed as part of the one or more second linkages 180 and/or the sliding member 72 or may be connected to at least a portion of the one or more second linkages 180 and/or the sliding member 72 as one or more separate components. It is within the scope of this disclosure and as a non-limiting example that the one or more second spacers 186 may be connected to the one or more second linkages 180 and/or the sliding member 72 by using one or more welds, one or more adhesives, one or more mechanical fasteners, a threaded connection, a spline connection and/or an interference fit connection.

At least a portion of one or more second arms 188 may be connected to at least a portion of the second end portion 184 of the one or more second linkages 180. The one or more second arms 188 may provide a positive stop for at least a portion of the one or more ladders 5 and may aid in securing at least a portion of the one or more ladders 5 to at least a portion of the ladder rack assembly 3. It is within the scope of this disclosure and as a non-limiting example that the one or more second arms 188 may be integrally formed as part of the one or more second linkages 180 or may be integrally connected to at least a portion of the one or more second linkages 180 as one or more separate components. As a non-limiting example, the one or more second arms 188 may be connected to the one or more second linkages 180 by using one or more welds, one or more adhesives, one or more mechanical fasteners, a threaded connection, a spline connection and/or an interference connection.

According to the embodiment where the one or more second arms 188 are a separate component from the one or more second linkages 180, the one or more second arms 188 may include one or more first mounting apertures 189 and/or one or more second mounting apertures 191 therein. The one or more first and/or second mounting apertures 189 and/or 191 may be of a size and shape to receive and/or retain at least a portion of one or more mechanical fasteners therein. As best seen in FIG. 4 and as a non-limiting example, at least a portion of the one or more first apertures 189 may be substantially arcuate in shape and/or may have a substantially continuous radius R2 from a theoretical center of the one or more second mounting apertures 191 in the one or more second arms 188 of the ladder rack assembly 3. By providing the one or more first apertures 189 with a substantially arcuate shape, it may allow the one or more second arms 188 to be selectively rotated downward toward the base member 30 and the sliding member 72 until the they are substantially flat or substantially parallel to the base member 30 and the sliding member 72. As a result, when the ladder rack assembly 3 is in the first position 114 and installed on the vehicle 2 for transport, the ladder rack assembly 3 may be in its most compact form factor allowing both the vehicle 2 and the ladder rack assembly 3 installed thereon to fit within the rail car (not shown). Additionally, by providing the one or more first apertures 189 with a substantially arcuate shape, it may allow the one or more second arms 188 to be selectively rotated a pre-determined amount as needed to allow the one or more ladders 5 to be installed onto or removed from the ladder rack assembly 3.

In accordance with the embodiment illustrated in FIGS. 1, 4, 5A, 6A, 6B, 7A and 8 of the disclosure and as a non-limiting example, the ladder rack assembly may include a ladder mounting member 190. The ladder mounting member 190 may provide a mounting surface for at least a portion of the one or more ladders 5 of the ladder rack assembly 3. Additionally, the ladder mounting member 190 may be axially and/or radially movable relative to the base member 30 of the ladder rack assembly 3. It is therefore to be understood that the ladder mounting member 190 aids in allowing one or more users (not shown) to quickly, easily, safely, and conveniently retrieve the one or more ladders 5 from the roof 7 of the vehicle 2 and to quickly, easily, safely, and conveniently store the one or more ladders 5 on the roof 7 of the vehicle 2 as needed.

As best seen in FIG. 4 and as a non-limiting example, the ladder mounting member 190 may have an inner surface 192, an outer surface 194, a first side portion 196, a second side portion 198, a first end portion 200, a second end portion 202 and an intermediate portion 204 interposed between the first and second end portions 200 and 202. At least a portion of the first and second side portions 196 and 198 are disposed on opposing sides of a central top portion 206 of the ladder mounting member 190 of the ladder rack assembly 3. It is within the scope of this disclosure and as a non-limiting example that the first side portion 196 and the second side portion 198 of the ladder mounting member 190 may extend radially inward from and substantially perpendicular to at least a portion of the central top portion 206 of the ladder mounting member 190. As a result, it is therefore within the scope of this disclosure and as a non-limiting example that at least a portion of the first side portion 196 may extend substantially parallel to at least a portion of the second side portion 198.

According to the embodiment illustrated in FIG. 4 of the disclosure and as a non-limiting example, the ladder mounting member 190 may include one or more first ladder member flanges 208 and/or one or more second ladder member flanges 210. The one or more first and second ladder member flanges 208 and 210 may extend inward from at least a portion of an end of the first and second side portions 196 and 198 respectively, opposite the central top portion 206 of the ladder mounting member 190. In accordance with the embodiment illustrated in FIG. 4 and as a non-limiting example, at least a portion of the one or more first and second ladder member flanges 208 and 210 may extend substantially perpendicular to the first and second side portions 196 and 198 of the ladder mounting member 190. Additionally, as illustrated in FIG. 4 and as a non-limiting example, at least a portion of the one or more first and second ladder member flanges 208 and 210 may extend substantially parallel to the central top portion 206 of the ladder mounting member 192. As a result, the one or more first and second ladder member flanges 208 and 210 aid in defining a first ladder mounting member space 212 and a second ladder mounting member space 214 within the ladder mounting member 190. The first and second ladder mounting member spaces 212 and 214 may be of a size and shape to receive and/or retain at least a portion of one or more first rolling members 216 and/or one or more second rolling members 218 therein. This aids in retaining the ladder mounting member 190 relative to the sliding member 72 while still allowing the ladder mounting member 190 to selectively translate axially and/or radially relative to the sliding member 72 and the base member 30 when the ladder rack assembly 3 is in operation.

In accordance with the embodiment illustrated in FIGS. 3 and 6B and as a non-limiting example, at least a portion of the one or more first and second rolling members 216 and 218 may be connected to at least a portion of the second end portion 123 of the first and second side portions 128 and 130 respectively of the sliding member 72. The one or more first and second rolling members 216 and 218 aid in securing the ladder mounting member 190 relative to the sliding member 72 of the ladder rack assembly 3. Additionally, the one or more first and second rolling members 216 and 218 aid in providing a pivot point for the ladder mounting member 190 about the sliding member 72. Furthermore, the one or more first and second rolling members 216 and 218 aid in allowing the ladder mounting member 190 to selectively, smoothly and easily translate linearly and/or radially relative to the sliding member 72. It is within the scope of this disclosure and as a non-limiting example that the one or more first and second rolling members 216 and 218 may be connected to at least a portion of the sliding member 72 by using one or more mechanical fasteners.

The ladder rack assembly 3 may include one or more second bumper members 220. The one or more second bumper members 220 may be used to reduce the overall harshness associated with the operation of the ladder rack assembly 3. As a result, the one or more second bumper members 200 aid in increasing the overall life and durability of the ladder rack assembly 3 and reduces the over amount of wear and tear that the ladder rack assembly 3 imposed on the vehicle 2. When the ladder rack assembly 3 is in a third position 222 illustrated in FIGS. 7-8, at least a portion of the one or more second bumper members 220 may in in direct contact with at least a portion of the outer surface 126 of the second end portion 123 of the central top portion 132 of the sliding member 72. As best seen in FIG. 6B of the disclosure and as a non-limiting example, at least a portion of the one or more second bumper members 220 may be of a size and shape to be received and/or retained within at least a portion of the first and/or second ladder mounting member spaces 212 and/or 214 in the ladder mounting member 190. It is within the scope of this disclosure and as a non-limiting example that at least a portion of the one or more second bumper members 220 may be connected to at least a portion of the inner surface 192 of the one or more first and/or second ladder member flanges 208 and/or 210, the inner surface 192 of the first and/or second side portions 196 and/or 198, and/or the inner surface 192 of the central top portion 206 of the ladder mounting member 190.

As best seen in FIG. 6B and as a non-limiting example, at least a portion of the second end portion 152 of the one or more first driving members 144 may be integrally and pivotably connected to at least a portion of the first end portion 200 of the first side portion 196 of the ladder rack member 190. Additionally, as illustrated in FIG. 6B and as a non-limiting example, at least a portion of the second end portion 174 of the one or more second drive members 145 may be integrally and pivotably connected to at least a portion of the first end portion 200 of the second side portion 198 of the ladder mounting member 190. As a result, it is therefore to be understood that the rotational energy from the one or more first shafts 80, the one or more first drive members 144 and the one or more second drive members 145 may be translated to the ladder loading member 190 of the ladder rack assembly 3. This aids in allowing the one or more first shafts 80 to selectively translate or drive the ladder loading member linearly and/or radially relative to the base member 30 and the sliding member 72 of the ladder rack assembly 3. It is within the scope of this disclosure and as a non-limiting example that the second end portion 152 and 174 of the one or more first and second driving members 144 and 145 may be connected to the ladder mounting member 190 by using one or more mechanical fasteners.

The ladder mounting member 190 may include one or more ladder mounting member apertures 224 extending from the inner surface 192 to the outer surface 194 of the central top portion 206 thereof. The one or more ladder mounting member apertures 224 in the ladder mounting member 190 may aid in assembling the ladder rack assembly 3, may aid in reducing the overall weight of the ladder rack assembly 3, may aid assembling the ladder rack assembly 3, and/or may aid in reducing the overall costs associated with the ladder rack assembly 3. As best seen in FIG. 4 of the disclosure and as a non-limiting example, one or more ladder mounting member apertures 224 may be aligned with the one or more sliding member apertures 134 in the sliding member 72 and the one or more base member apertures 110 in the base member 30. It is within the scope of this disclosure and as a non-limiting example that the one or more ladder mounting member apertures 224, one or more sliding member apertures 134 and the one or more base member apertures 110 may be of a size and shape to receive and/or retain at least a portion of a locking member (not shown). The locking member (not shown) may aid in locking and preventing the ladder rack assembly 3 from moving when the vehicle 2 is in transit from one location to another. Additionally, the locking member (not shown) may be used as an anti-theft device in order to aid in preventing the one or more ladders 5 retained by the ladder rack assembly 3 from being stolen.

According to the embodiment illustrated in FIGS. 1, 4, 5A, 6A, 6B, and 7A of the disclosure and as a non-limiting example, the ladder mounting member 190 may include one or more first grooves 226 on and/or in the central top portion 206 thereof. The one or more first grooves 226 of the ladder mounting member 190 may be of a size and shape to receive and/or retain at least a portion of one or more retention members 228 therein. The one or more retention members 228 may be operably configured in order to selectively slide within and/or be selectively secured and retained within the one or more first grooves 226. As a result, it is therefore to be understood that the one or more retention members 228 may be selectively movable as needed in order to receive and/or retain at least a portion of the one or more ladders 5 within the ladder rack assembly 3. It is within the scope of this disclosure and as a non-limiting example that the one or more first grooves 226 may be integrally formed as part of the ladder mounting member 190 or may be integrally connected to at least a portion of the ladder mounting member 190 as one or more separate components. As result, it is within the scope of this disclosure and as a non-limiting example that the one or more first grooves 226 may be connected to the ladder mounting member 190 by using one or more welds, one or more adhesives, one or more mechanical fasteners, a threaded connection, a spline connection and/or an interference fit connection.

As best seen in FIG. 1 of the disclosure and as a non-limiting example, the one or more retention members 228 may have a base portion 230, one or more arm portions 232, and/or one or more retaining portions 234. In accordance with the embodiment illustrated in FIG. 1 and as a non-limiting example, at least a portion of the base portion 230 of the one or more retention members 228 may extend substantially parallel to at least a portion of the central top portion 206 of the ladder mounting member 190. Additionally, in accordance with the embodiment illustrated in FIG. 1 and as a non-limiting example, at least a portion of the one or more arm portions 232 may extend substantially perpendicular to at least a portion of the base portion 230 of the one or more retention members 228 and the central top portion 206 of the ladder mounting member 190. Furthermore, in accordance with the embodiment illustrated in FIG. 1 and as a non-limiting example, at least a portion of the one or more retaining portions 234 may extend substantially perpendicular to at least a portion of the one or more arm portions 232 and may extend substantially parallel to at least a portion of the base portion 230 and/or the central top portion 206. It is within the scope of this disclosure and as a non-limiting example that the base portion 230, the one or more arm portions 232, and/or the one or more retaining portions 234 may be integrally formed together or the base portion 230, the one or more arm portions 232, and/or the one or more retaining portions 234 may be integrally connected to each other as one or more separate components. As a result, it is within the scope of this disclosure and as a non-limiting example that the base portion 230, the one or more arm portions 232, and/or the one or more retaining portions 234 may be connected to each other by using one or more welds, one or more adhesives, one or more mechanical fasteners, a threaded connection, a spline connection and/or an interference fit connection.

The base portion 230, the one or more arm portions 232, the one or more retaining portions 234 of the one or more retention members 228 in combination with the one or more first and/or second arms 166 and/or 188 may define a ladder retention space 236 therein. As best seen in FIGS. 1, 5B, 6C, and 7B of the disclosure and as a non-limiting example, the ladder retention space 236 may be of a size and shape to receive and/or retain at least a portion of the one or more ladders 5 therein. When the ladder rack assembly 3 is in operation, the one or more ladders 5 may rest on at least a portion of the one or more arm portions 232 of the one or more retention members 228 and the one or more retaining portions 234 of the one or more retention members 228 may aid in preventing the one or more ladders 5 from inadvertently falling off of the vehicle 2. As a result, this arrangement aids in improving the overall safety associated with the operation of the ladder rack assembly 3 by preventing damage that may otherwise occur to the one or more operators (not shown), the vehicle 2, the one or more ladders 5, and/or to the ladder rack assembly 3 itself.

Figure 5:
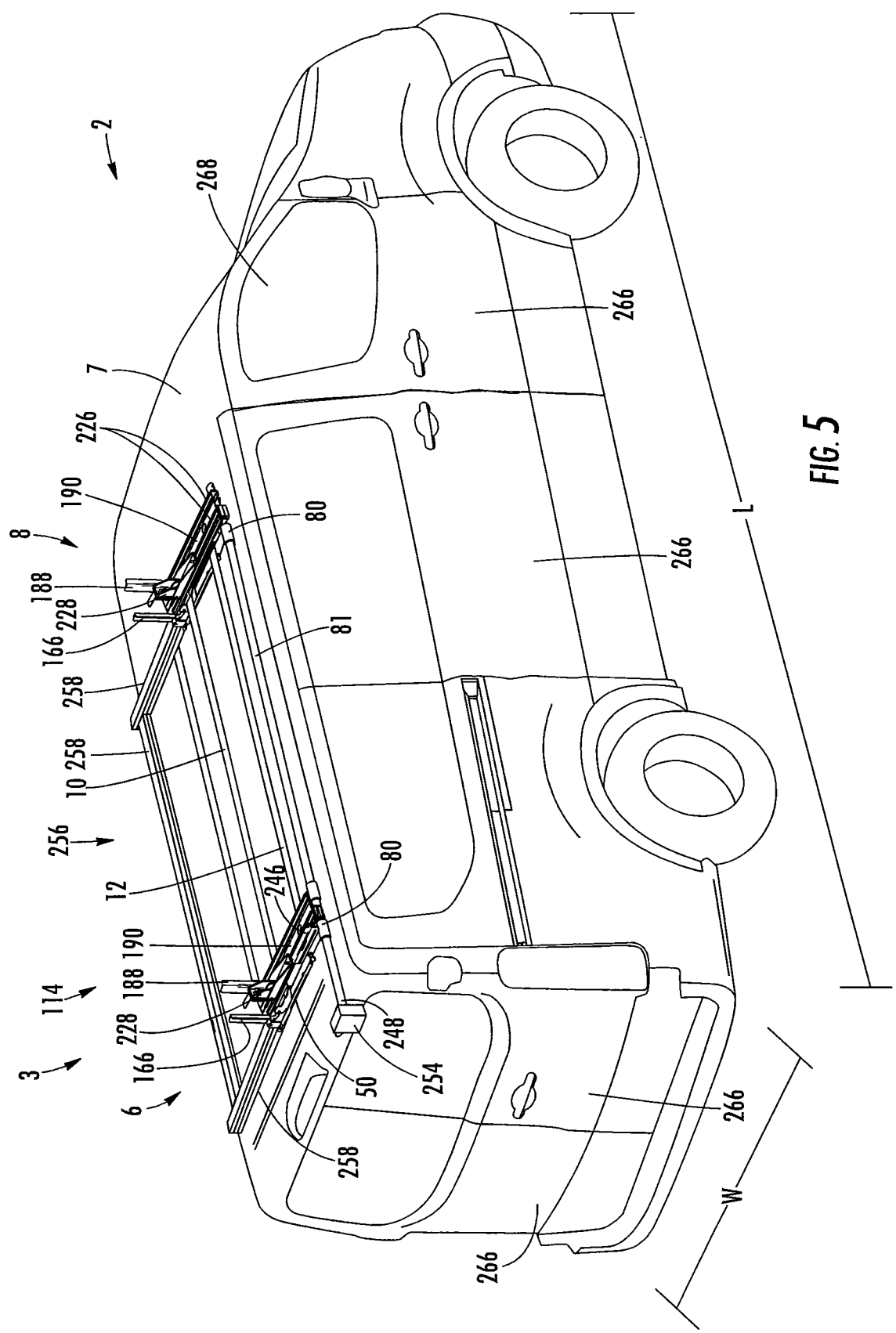
FIG. 5 is a schematic perspective view of a vehicle having the ladder rack assembly illustrated in FIGS. 1-4 of the disclosure where the ladder rack assembly is in a first position.
Figure 5A:
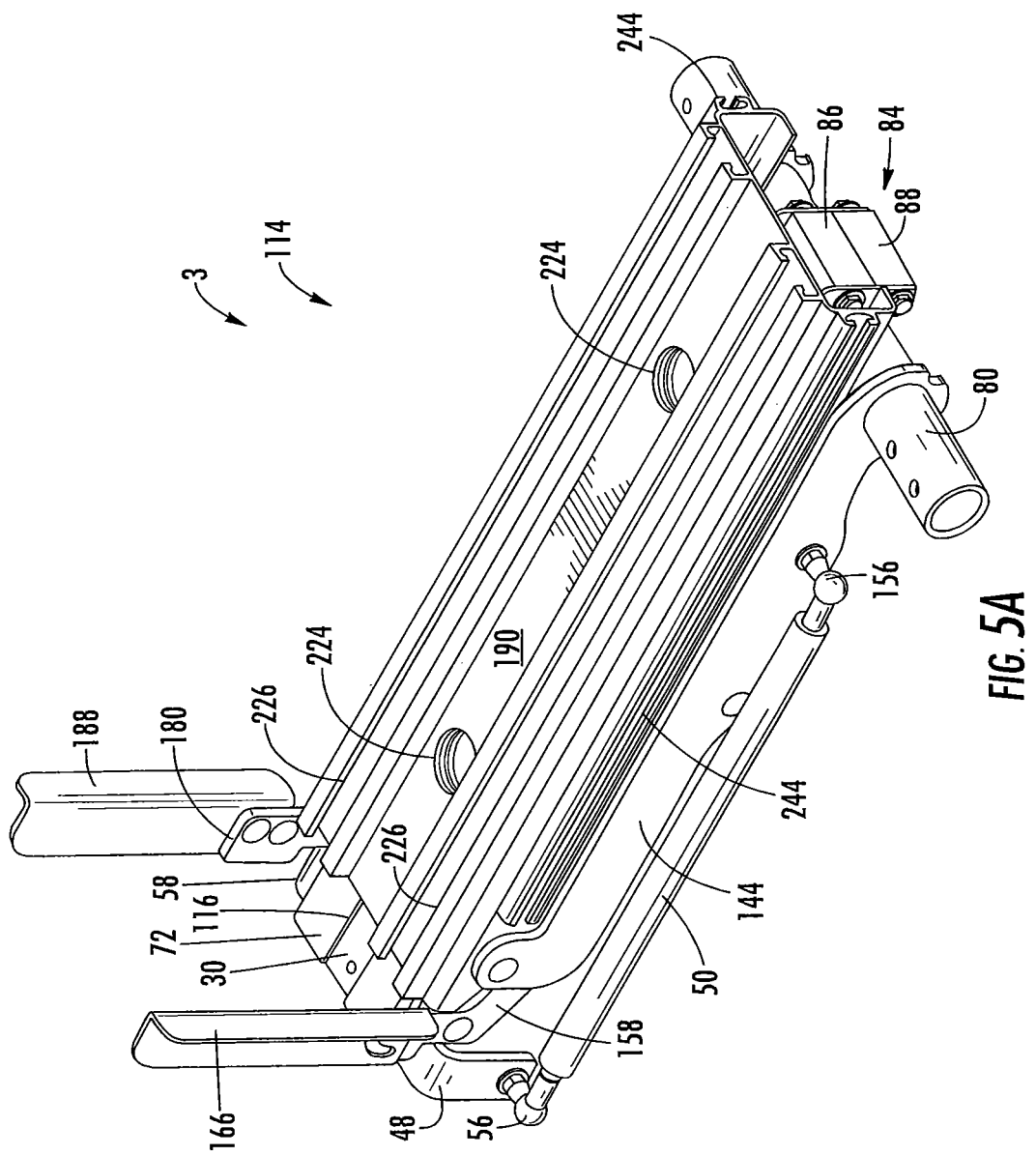
FIG. 5A is a schematic perspective view of a portion of the mechanism of the ladder rack assembly illustrated in FIGS. 1-5 where the mechanism is in the first position illustrated in FIGS. 1 and 5 of the disclosure.
Figure 5B:
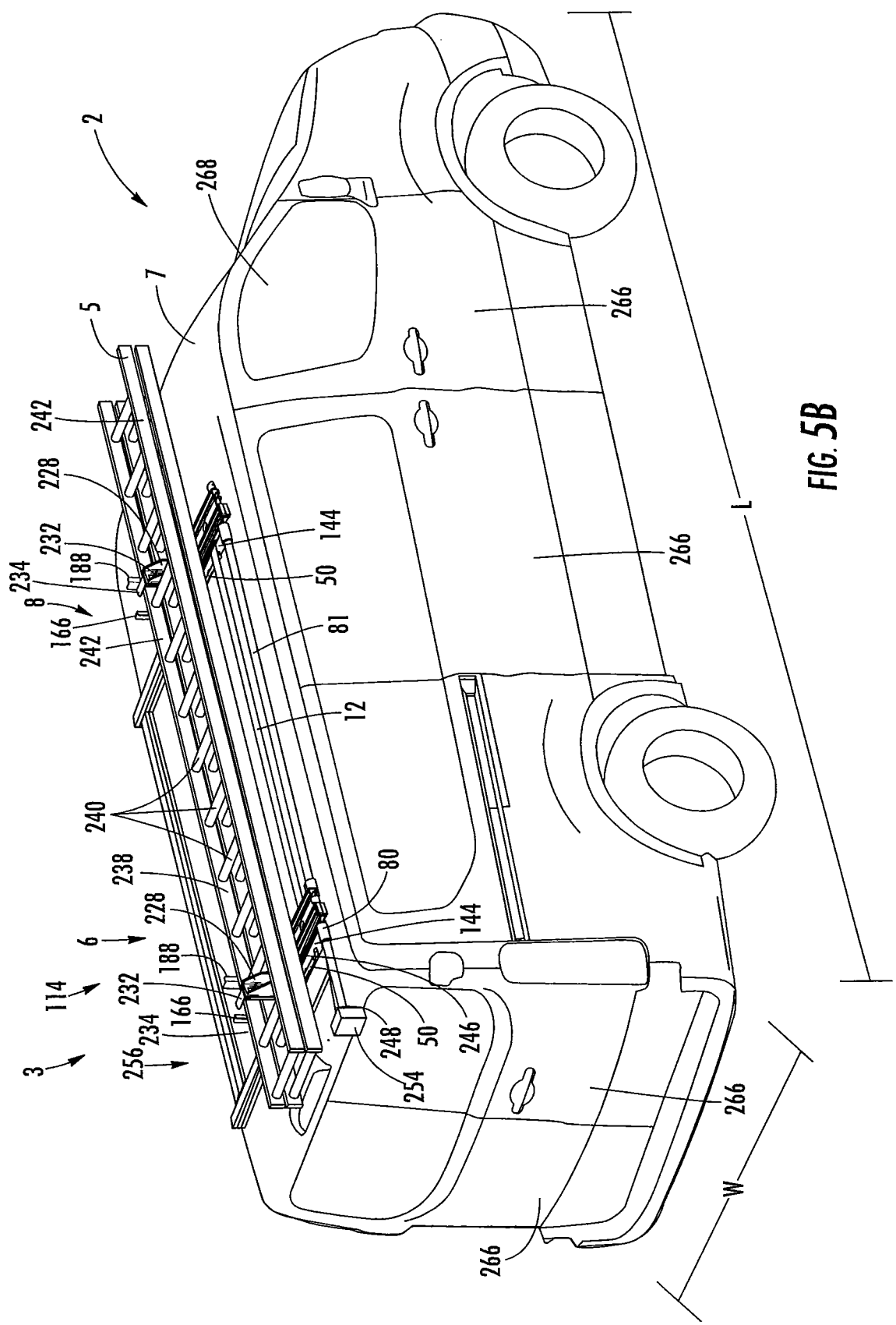
FIG. 5B is a schematic perspective view of the ladder rack assembly in the first position illustrated in FIGS. 1-5A where the ladder rack assembly has a ladder disposed thereon.

Additionally, the base portion 230, the one or more arm portions 232, the one or more retaining portions 234 of the one or more retention members 228 in combination with the one or more first and/or second arms 166 and/or 188 may aid in ensuring that the one or more ladders 5 do not inadvertently fall off the vehicle 2 when in transit. As best seen in FIG. 5B and as a non-limiting example, at least a portion of one or more arm portions 232 of the one or more retention members 228 may be of a size and shape to be received within a gap 238 between the one or more steps 240 of the one or more ladders 5. As a result, it is therefore to be understood that the one or more arm portions 232 of the one or more retention members 228 aid in preventing the one or more ladders 5 from sliding back and forth along the length L of the vehicle 2 beyond a pre-determined amount. Once at least a portion of the one or more steps 240 of the one or more ladders 5 come into direct contact with at least a portion of the one or more arm portions 232, the one or more ladders 5 will be prevented from translating any further. This aids in improving the overall safety associated with the operation of the ladder rack assembly 3 by preventing damage that may otherwise occur to the one or more operators (not shown), the vehicle 2, one or more other vehicles (not shown) traveling near the vehicle 2, the one or more ladders 5, and/or to the ladder rack assembly 3 itself.

In accordance with the embodiment illustrated in FIG. 5B and as a non-limiting example, at least a portion of the one or more retaining portions 234 of the one or more retention members 228 may be disposed radially outboard from and/or in direct contact with at least a portion of a body portion 242 of the one or more ladders 5. The one or more retaining portions 234 may be selectively movable relative to the one or more arm portions 232 of the one or more retention members 228. As a result, it is therefore to be understood that the one or more retaining portions 234 may be moved away from the base portion 230 and the ladder mounting member 190 in order to provide the space needed to allow the one or more ladders 5 to seat within the ladder retention space 236. Once disposed within the ladder retention space 236, the one or more retaining portion 234 may be moved toward the base portion 230 and the ladder mounting member 190 in order to bring the one or more retaining portions 234 into direct contact with at least a portion of the one or more ladders 5. This aids in reducing the overall safety of the ladder rack assembly 3 by limiting the overall amount of up and down movement that the one or more ladders 5 may experience when in transit on the vehicle 2. Additionally, the engagement between the one or more arm portions 232, the one or more retaining portions 234, the body portion 242 and/or the one or more steps 240 of the one or more ladders 5 aid in positively securing the one or more ladders 5 to the ladder rack assembly 3 and the vehicle 2. As a result of this engagement, the one or more ladders 5 may be prevented from moving within the ladder rack assembly 3 when in transit on the vehicle 2.

It is within the scope of this disclosure and as a non-limiting example that the one or more retaining portions 234 of the one or more retention members 228 may include an amount of frictional material (not shown) thereon. When the one or more retaining portions 234 are in the first position 114, at least a portion of the frictional material (not shown) may be in direct contact with at least a portion of the body portion 242 of the one or more ladders 5. The engagement between the frictional material (not shown) and the body portion 242 aids in securing and preventing the one or more ladders 5 from moving relative to the ladder rack assembly 3. Additionally, the engagement between the frictional material (not shown) and the body portion 242 may aid in absorbing and/or dampening an amount of vibration experienced by the ladder rack assembly 3 while the vehicle 2 is in transit. As a result, this aids in reducing the overall harshness associated with the ladder rack assembly 3 and aids in increasing the overall life and durability of the ladder rack assembly 3. It is within the scope of this disclosure and as a non-limiting example that the frictional material (not shown) may be a polymeric material, an elastomeric material and/or a rubber composition.

As best seen in FIGS. 1, 4, 5A, 6A, and 7A of the disclosure and as a non-limiting example, the ladder mounting member 190 may include one or more second grooves 244 on and/or in the first side portion 196 and/or the second side portion 198 of the ladder mounting member 190. The one or more second grooves 244 of the ladder mounting member 190 may be of a size and shape to receive and/or retain at least a portion of one or more support brackets 246 therein. The one or more support brackets 246 may be operably configured in order to selectively slide within and/or be selectively secured and retained within the one or more second grooves 244. When installed within the ladder rack assembly 3, at least a portion of the one or more support brackets 246 may be in direct contact with at least a portion of the base portion 230 of the one or more retention members 228. As a result, it is therefore to be understood that the one or more support brackets 246 may be selectively movable as needed to securely prevent the one or more retention members 228 from moving within the one or more first grooves 226 and/or to secure the one or more ladders 5 relative to the ladder mounting member 190. It is within the scope of this disclosure and as a non-limiting example that at the one or more second grooves 244 may be integrally formed as part of the ladder mounting member 190 or may be integrally connected to at least a portion of the ladder mounting member 190 as one or more separate components. As result, it is within the scope of this disclosure and as a non-limiting example that the one or more second grooves 244 may be connected to the ladder mounting member 190 by using one or more welds, one or more adhesives, one or more mechanical fasteners, a threaded connection, a spline connection and/or an interference fit connection.

According to the embodiment illustrated in FIG. 1 of the disclosure and as a non-limiting example, the ladder rack assembly 3 may include one or more second shafts 248 having a first end portion 250 and a second end portion 252. At least a portion of the first end portion 250 of the one or more second shafts 248 may be drivingly connected to at least a portion of the one or more sources of rotational power 254. Additionally, at least a portion of the second end portion 252 of the one or more second shafts 248 may be connected to at least a portion of an end of the one or more first shafts 80, opposite the one or more third attaching members 81. As a result, it is therefore to be understood that the one or more second shafts 148 may be used in order to transfer an amount of rotational energy needed to operate the ladder rack assembly 3 from the one or more sources of rotational power 254 to the one or more first shafts 80 of the ladder rack assembly 3. It is within the scope of this disclosure and as a non-limiting example that the one or more second shafts 248 may be integrally connected to at least a portion of the one or more first shafts 80 by using one or more welds, one or more adhesives, one or more mechanical fasteners, a threaded connection, a spline connection and/or an interference fit connection.

As best seen in FIGS. 5, 5B, 6, 6C, 7 and 7B of the disclosure and as a non-limiting example, the ladder rack assembly 3 may include a vehicle mounting assembly 256. The vehicle mounting assembly 256 may be used in order to fixedly attach at least a portion of the ladder rack assembly 3 to at least a portion of the vehicle 2. The vehicle mounting assembly 256 may include one or more mounting portions 258 that extend along the length L and/or the width W of the vehicle 2. It is within the scope of this disclosure and as a no-limiting example that the vehicle mounting assembly 256 may be integrally connected to the vehicle 2 by using one or more welds, one or more adhesives, one or more mechanical fasteners, a threaded connection, and/or an interference fit connection. Additionally, it is within the scope of this disclosure and as a non-limiting example that the vehicle mounting assembly 256 may be connected to and may fixedly secure at least a portion of the ladder rack assembly 3 to at least a portion of the roof 7 of the vehicle 2.

The one or more mounting portions 258 of the vehicle mounting assembly 256 may be used in order to fixedly secure at least a portion of the first and/or second mechanism 6 and/or 8 of the ladder rack assembly 3 to at least a portion of the vehicle 2. As a result, it is therefore to be understood that the one or more mounting portions 258 may be of a size and shape to receive and/or retain at least a portion of the base member 30 of the ladder rack assembly 3. It is within the scope of this disclosure and as a non-limiting example that the base member 30 may be integrally formed as part of the one or more mounting portions 258 or may be integrally connected to at least a portion of the one or more mounting portions 258 as one or more separate components. As a non-limiting example, the base member 30 may be integrally connected to the one or more mounting portions 258 by using one or more welds, one or more adhesives, one or more mechanical fasteners, a threaded connection, a spline connection, and/or an interference fit connection.

When the ladder rack assembly 3 is in the first position 114 illustrated in FIGS. 1 and 4-5B of the disclosure and as a non-limiting example, the one or more ladders 5 are safely and securely stored on the vehicle 2. Once in the first position 114, the one or more ladders 5 are fixedly secured to the vehicle 2 and are ready to be safely and conveniently transported from one location to another. As illustrated in FIGS. 1 and 4-5B and as a non-limiting example, when the ladder rack assembly 3 is in the first position 114, the ladder rack assembly 3 is completely collapsed on the vehicle 2 and in its smallest and most compact form. In this position, the central top portion 206 of the ladder mounting member 190 may be substantially parallel to the central top portion 132 of the sliding member 72, which in turn may be substantially parallel to the central portion 31 of the base member 30. As a result, it is therefore to be understood that at least a portion of the central top portion 132 of the sliding member 72 may be disposed directly radially outboard from at least a portion of the central portion 31 of the base member 30 when the ladder rack assembly 3 is in the first position 114. Additionally, it is therefore to be understood that at least a portion of the central top portion 206 of the ladder mounting member 190 may be disposed directly radially outboard from at least a portion of the central top portion 132 of the sliding member 72. The radial stacking relationship of the base member 30, the sliding member 30 and the ladder mounting member 190 allows the ladder rack assembly 3 to attain the desired compact form factor when in the first position 114. This aids in allowing the vehicle 2 having the ladder rack assembly 3 installed thereon to fit within a rail car (not shown) as needed for shipping.

Figure 6C:
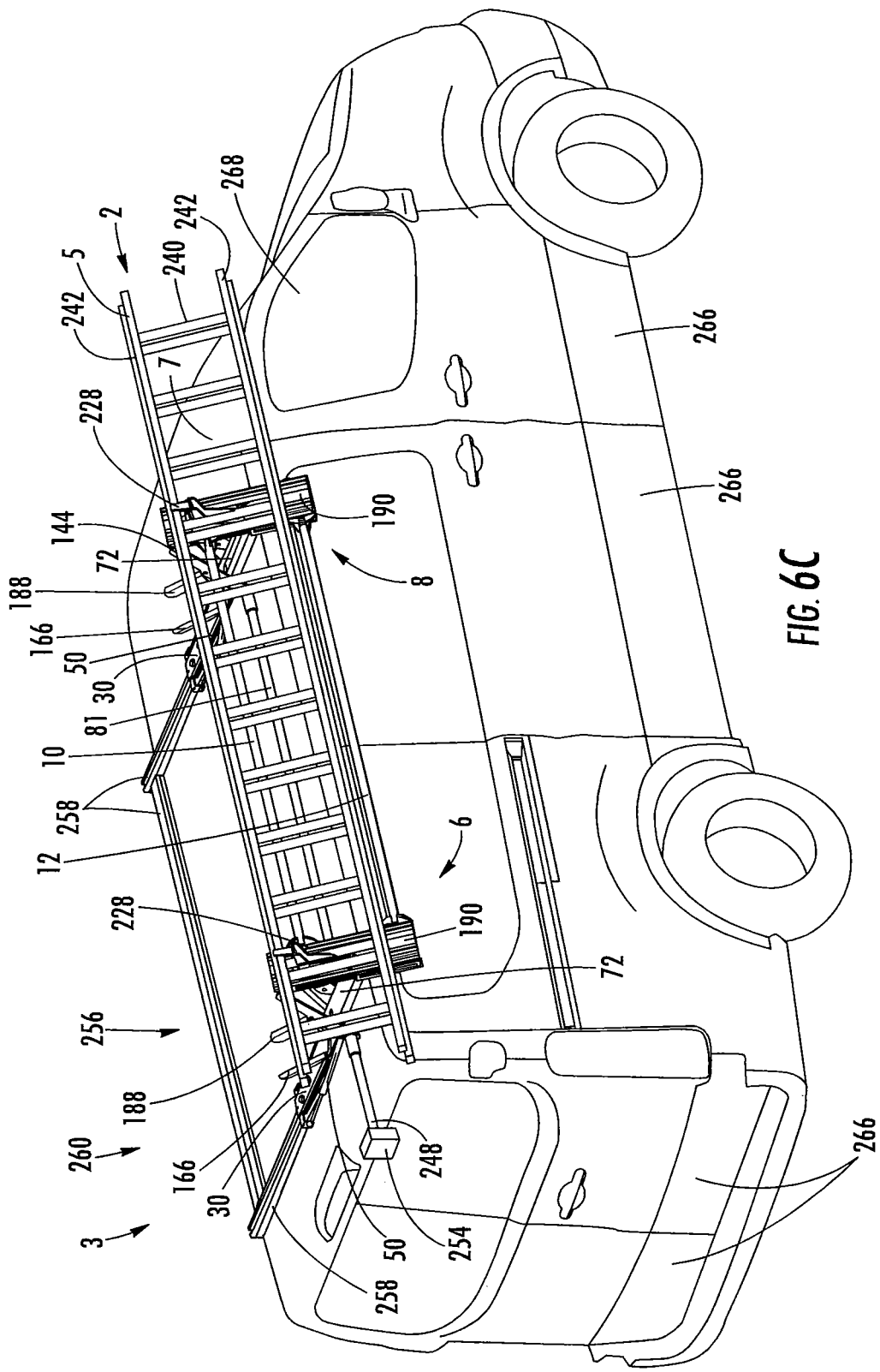
FIG. 6C is a schematic perspective view of the vehicle and ladder rack assembly illustrated in FIGS. 1-6C of the disclosure where the ladder rack assembly and the ladder installed thereon are in the second position.
Figure 7:
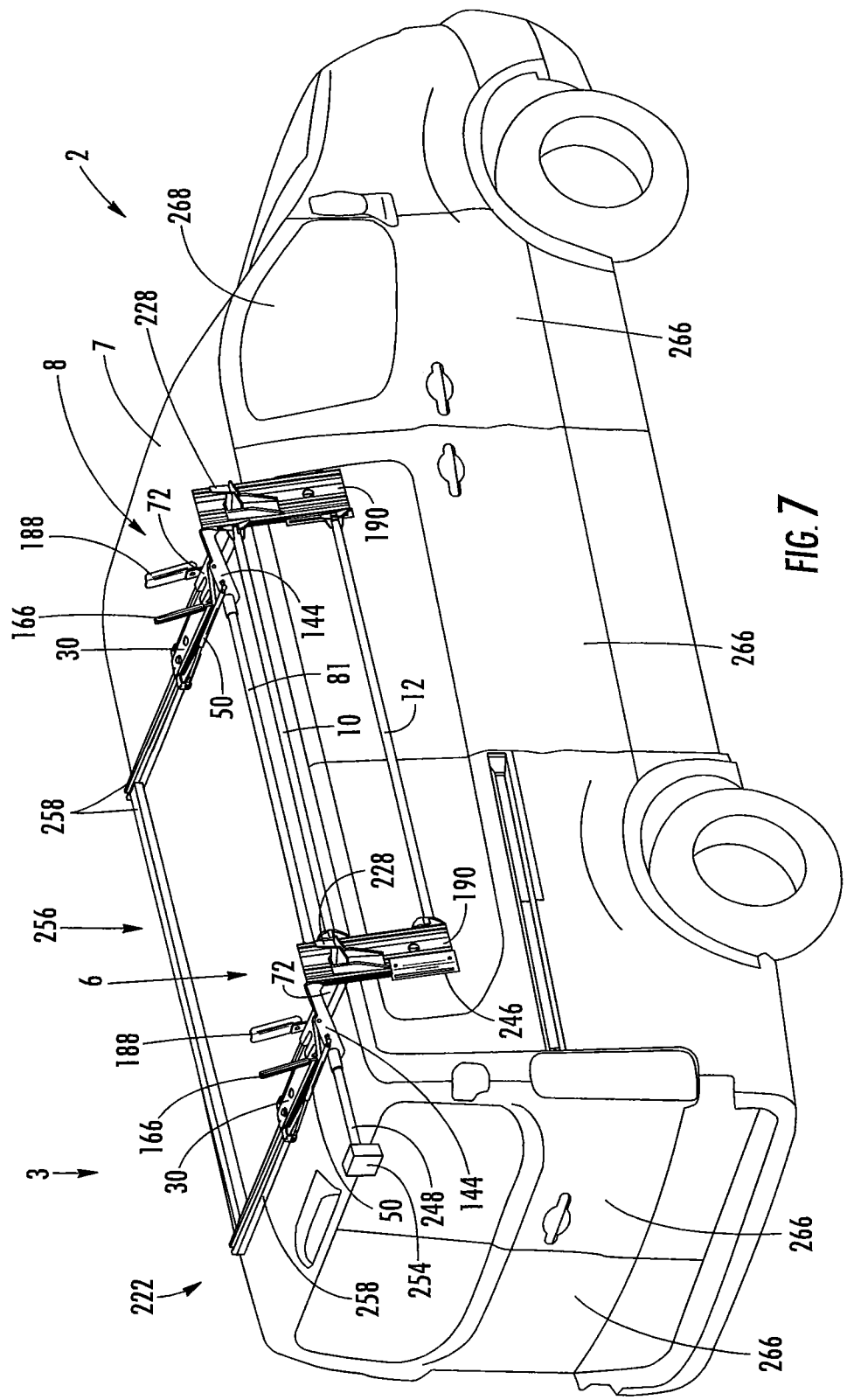
FIG. 7 is a schematic perspective view of the vehicle and the ladder rack assembly illustrated in FIGS. 1-6B of the disclosure where the ladder rack assembly is in a third position.
Figure 7A:
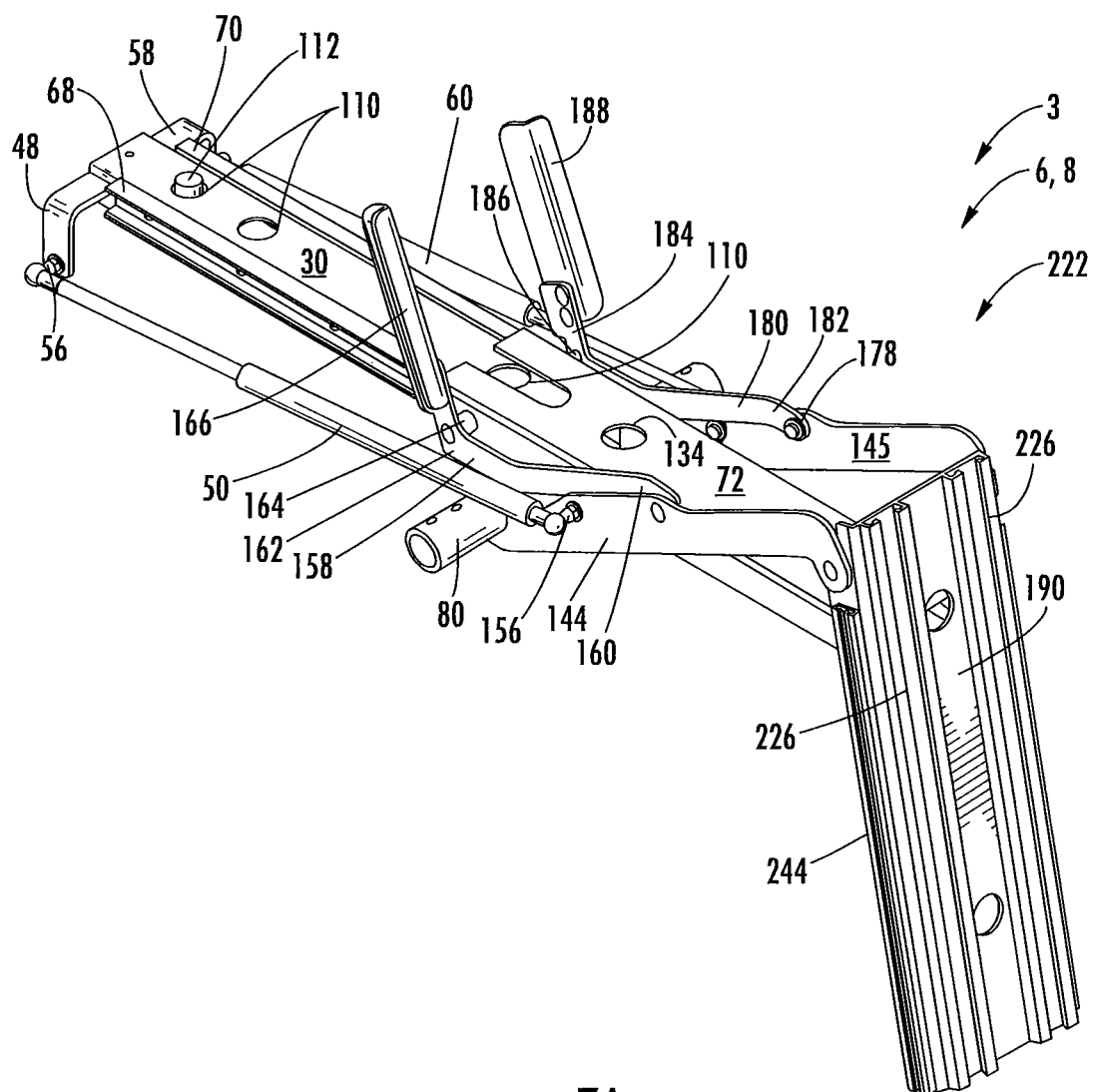
FIG. 7A is a schematic perspective view of a portion of the mechanism of the ladder rack assembly illustrated in FIGS. 1-7 where the mechanism is in the second position illustrated in FIG. 7 of the disclosure.
Figure 7B:
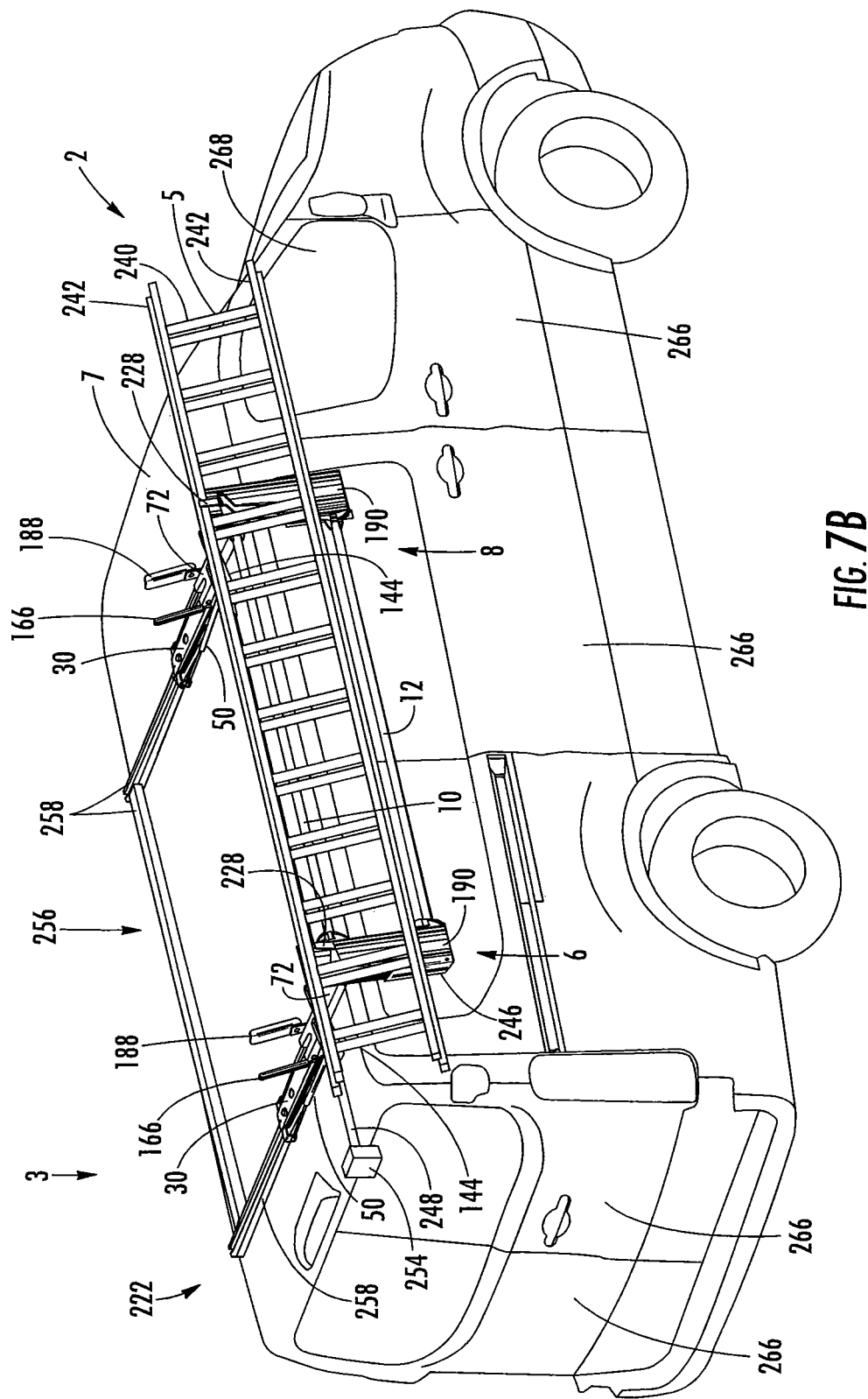
FIG. 7B is a schematic perspective view of the vehicle and ladder rack assembly illustrated in FIGS. 1-7A of the disclosure wherein the ladder rack assembly and the ladder installed thereon are in the third position.

Once the vehicle 2 has stopped and the one or more users (not shown) want to retrieve the one or more ladders 5 from the vehicle 2, the ladder rack assembly 3 may be selectively translated from the first position 114, to a second intermediate position 260 illustrated in FIGS. 6-6C, and finally to the third position 222 illustrated in FIGS. 7-7B. The second position 260 may be an intermediate or a transitional position where the first and/or second mechanisms 6 and/or 8 of the ladder rack assembly 3 are transitioning between the first and third positions 114 and 222.

In order to selectively translate the ladder rack assembly 3 from the first position to the second position 260, an amount of rotational energy needs to be transferred from the one or more sources of rotational power 254 to the one or more first shafts 80. As the one or more first shafts 80 rotate, the one or more first and/or second drive members 144 and/or 145 and the one or more first and/or second linkage members 158 and/or 180 drive the sliding member 72 linearly relative to the base member 30 away from the one or more first and second mounting members 48 and 58. Additionally, as the one or more first shafts 80 rotate, the one or more first and/or second drive members 144 and/or 145 drive the first end portion 200 of the ladder mounting member 190 upward away from the base member 30. Furthermore, as the one or more first shafts 80 rotate, the sliding member 72 drives the second end portion 202 of the ladder mounting member 190 outward away from the base member 30 and the vehicle 2. Still further, as the one or more first shafts 80 rotate, the one or more first and/or second drive members 144 and/or 145 expand the one or more first and/or second assist members 50 and/or 60 increasing their overall length. As best seen in FIG. 6C and as a non-limiting example, when the ladder rack assembly 3 is in the second position 260 the one or more ladders 5 are not retained by the one or more first and/or second arms 166 and/or 188. As a result, the one or more retention members 228 alone are used in order to retain the one or more ladders 5 on the ladder rack assembly 3 as the ladder rack assembly transitions from the first position 114 to the third position 222.

Figure 8:
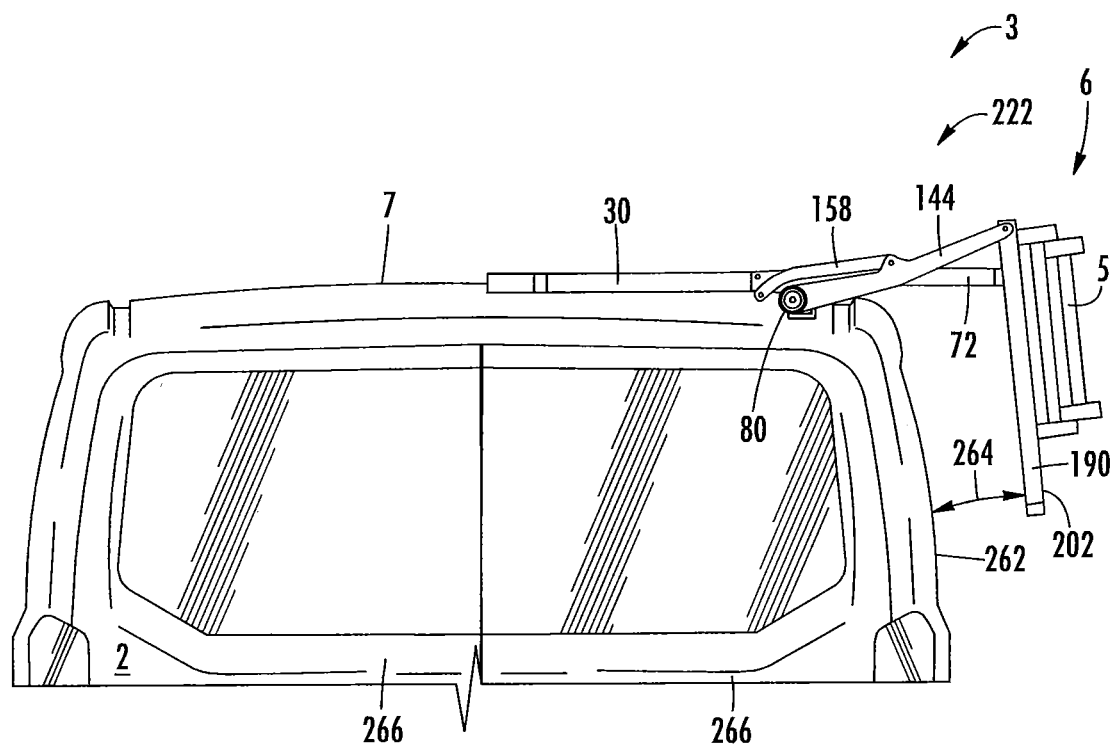
FIG. 8 is a schematic rear view of the vehicle and the ladder rack assembly illustrated in FIGS. 1-7B of the disclosure wherein the ladder rack assembly and the ladder thereon are in the third position illustrated in FIGS. 7-7B of the disclosure.

When the ladder rack assembly 3 is in the third position 222 illustrated in FIGS. 7-7B of the disclosure and as a non-limiting example, the ladder rack assembly 3 is in a loading and/or unloading position. Once in this position, the one or more users (not shown) may quickly, easily, safely, and conveniently load and/or retrieve the one or more ladders 5 from the vehicle 2 as needed. As the rotational power from the one or more sources of rotational power 254 continue to rotate the one or more first shafts 80, the one or more first and/or second drive members 144 and/or 145, and the one or more first and/or second linkage members 158 and/or 180, the sliding member 72 may be driven linearly relative to the base member 30 away from the one or more first and second mounting members 48 and 58. Additionally, as the one or more first shafts 80 rotate, the one or more first and/or second drive members 144 and/or 145 drive the first end portion 200 of the ladder mounting member 190 downward toward the sliding member 72 until the one or more second bumper members 220 contact at least a portion of the sliding member 72. As the ladder mounting member 190 translates radially inward, the ladder mounting member 190 may ride or slide along the one or more first and/or second rolling members 216 and/or 218 until the one or more second bumper members 220 contact at least a portion of the sliding member 72. Furthermore, as best seen in FIG. 8 and as a non-limiting example, as the one or more first shafts 80 rotate the sliding member 72 drives the ladder mounting member 190 outward away from the base member 30 and a side 262 of the vehicle 2 defining a gap 264 therebetween. The gap 264 may be large enough to allow the one or more users (not shown) to open one or more doors 266 of the vehicle 2. This will allow the one or more users (not shown) with easy access to an interior 268 of the vehicle 2 even when the ladder rack assembly 3 is in the third position 222. Additionally, this will allow the one or more users (not shown) to easily enter and/or exit the interior 268 of the vehicle as needed even when the ladder rack assembly 3 is in the third position illustrated in FIGS. 7-8 of the disclosure.

According to the embodiment illustrated in FIGS. 7-8 of the disclosure and as a non-limiting example, when the ladder rack assembly 3 is in the third fully expanded position 222 at least a portion of the central portion 31 of the base member 30 may be substantially parallel to at least a portion of the central top portion 132 of the sliding member 72. Additionally, when in the third position 222, at least a portion of the sliding member 72 is disposed axially outward from at least a portion of the second end portion 38 of the base member 30. In referencing FIGS. 7-8 and as a non-limiting example, when the ladder rack assembly 3 is in the third position 222 the second end portion 202 of the ladder mounting member 190 is disposed radially inboard from the sliding member 72 and the base member 30. As a result, the ladder mounting member 190 extends substantially vertical relative to the base member 30 and the sliding member 72 of the ladder rack assembly 3. Additionally, when in the third position 222, at least a portion of the ladder mounting member 190 is disposed axially outboard from at least a portion of the base member 30 and the sliding member 72 of the ladder rack assembly 3. This orientation of the various components of the ladder rack assembly 3 relative to each other aids in allowing the one or more users (not shown) to easily, quickly, conveniently, and safely installed, loaded or removed the one or more ladders 5 from the ladder rack assembly 3.

In light of the foregoing, it is therefore to be understood that the ladder rack assembly 3 illustrated in FIGS. 1-8 can be easily raised and/or lowered by the one or more users (not shown) as needed to access the one or more ladders 5. Additionally, it is to be understood that the ladder rack assembly 3 when in the third position 222 places the one or more ladders 5 in a location along the side of the vehicle 2 that is easily and safely accessible by the one or more users (not shown). Furthermore, it is to be understood that the ladder rack assembly 3 is more compact in size when in the first position 114 and does not block and/or obstruct access to and/or from the interior 268 of the vehicle 2 when in the third position 222.

Figure 9A:
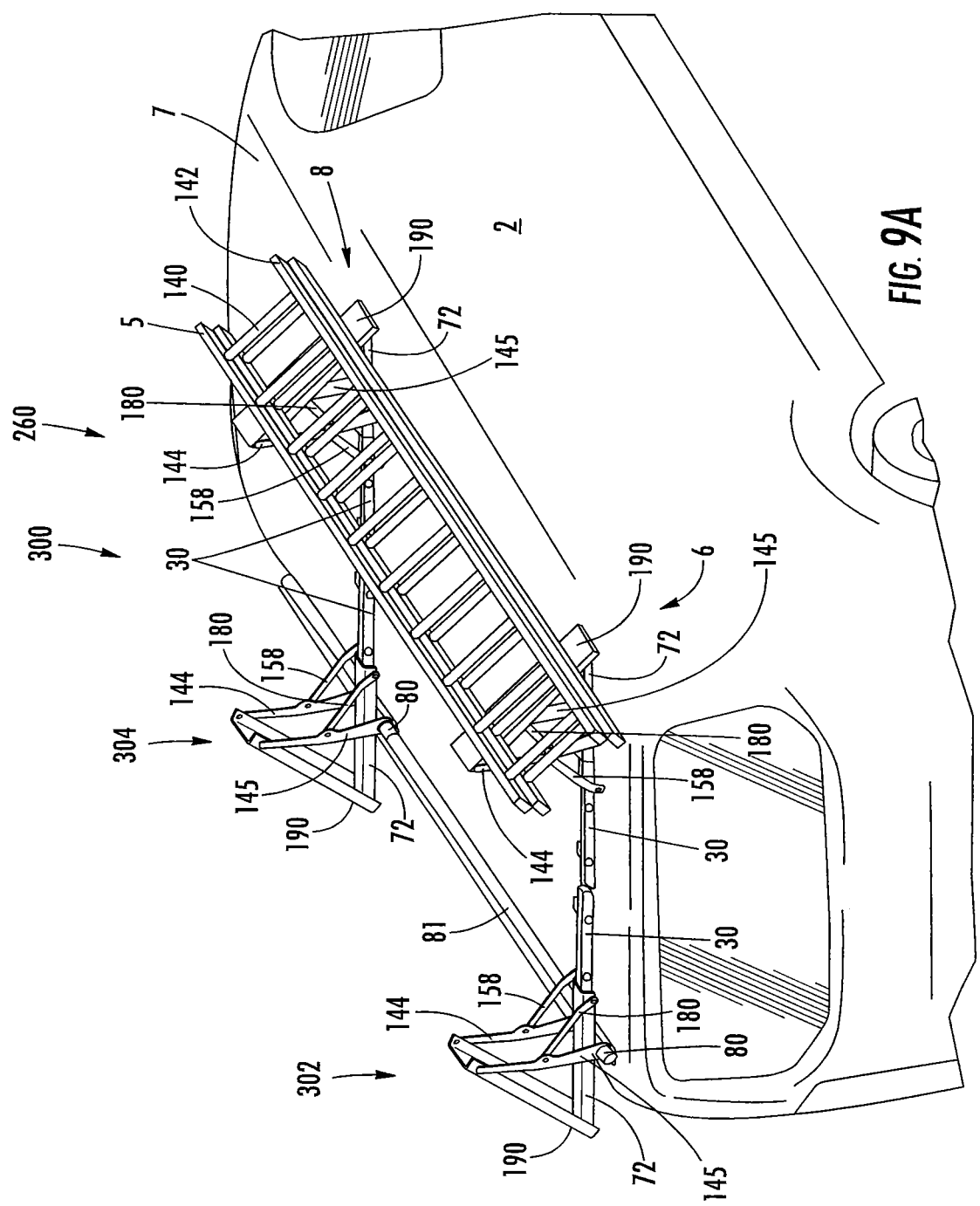
FIG. 9A is a schematic perspective view of the vehicle with ladder rack assembly according to the embodiment illustrated in FIG. 9 of the disclosure where the ladder rack assembly is in a second position.
Figure 9B:
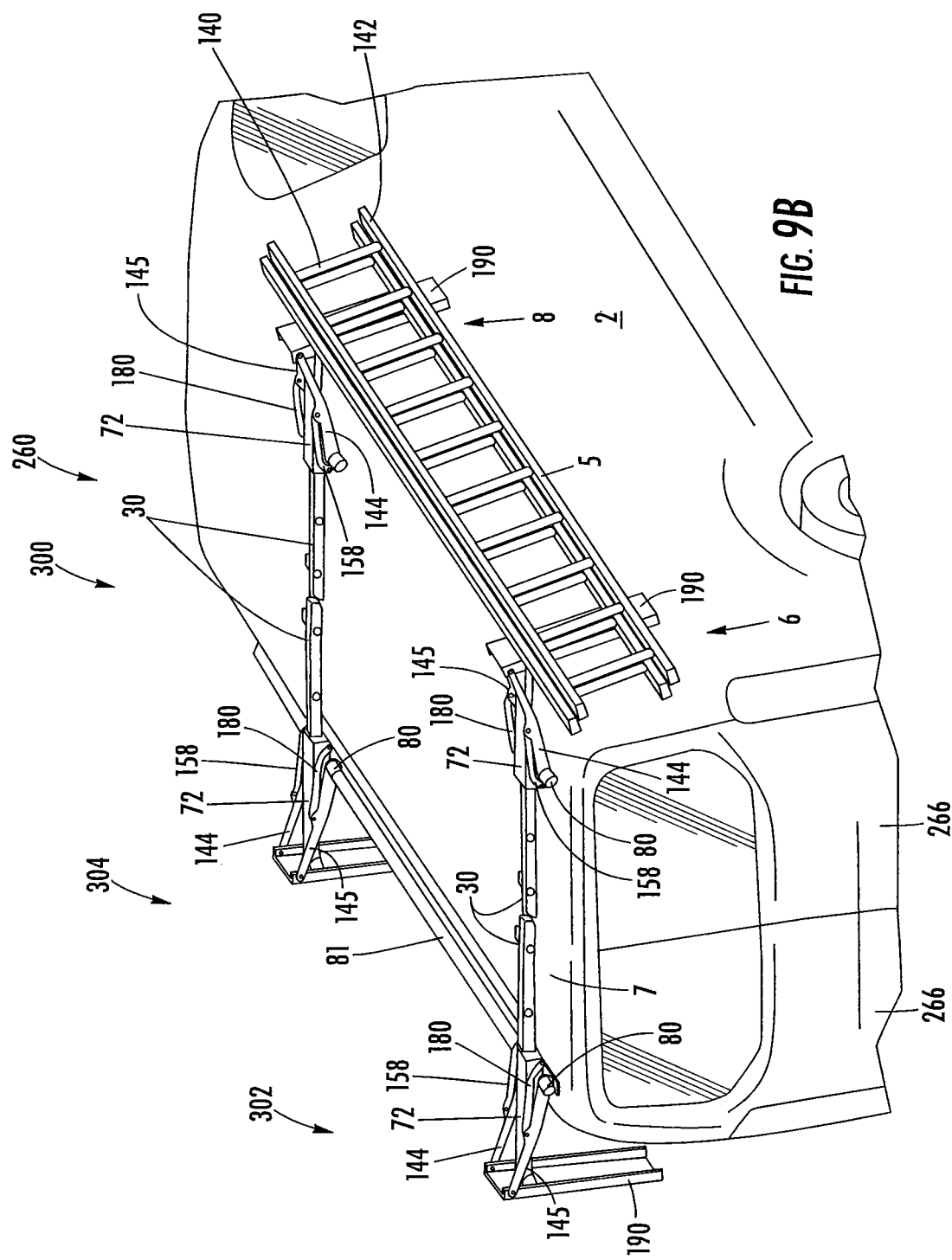
FIG. 9B is a schematic perspective view of the vehicle with ladder rack assembly according to the embodiment illustrated in FIGS. 9 and 9A of the disclosure where the ladder rack assembly is in a third position.

FIGS. 9-9B provide a schematic illustration of a vehicle 2 having a ladder rack assembly 300 according to an alternative embodiment of the disclosure. The ladder rack assembly 300 illustrated in FIGS. 9-9B is the same as the ladder rack assembly 3 illustrated in FIGS. 1-8, except where specifically noted below. In accordance with the embodiment illustrated in FIGS. 9-9B of the disclosure and as a non-limiting example, the ladder rack assembly 300 may include a third mechanism 302 and/or a fourth mechanism 304. The ladder rack assembly 300 may be of a size and shape to receive and/or retain at least a portion of the one or more ladders 5. According to the embodiment illustrated in FIGS. 9-9B of the disclosure and as a non-limiting example, at least a portion of the third and/or fourth mechanisms 302 and/or 304 may extend along at least a portion of the width W of the roof 7 of the vehicle 2.

As best seen in FIGS. 9-9B and as a non-limiting example, the third and/or fourth mechanisms 302 and/or 304 may be separate components from each other, however the third and/or fourth mechanisms 302 and/or 304 may be identical in their construction. Additionally, the third and/or fourth mechanisms 302 and/or 304 may be separate components from the first and/or second mechanisms 6 and/or 8, however the third and/or fourth mechanisms 302 and/or 304 be identical in their construction to the first and/or second mechanisms 6 and/or 8 described and illustrated in relation to FIGS. 1-8. It is therefore to be understood that the ladder rack assembly 300 may selectively translate between the first position 114 illustrated in FIG. 9, to the second position 260 illustrated in FIG. 9A, and finally to the third position 222 illustrated in FIG. 9B of the disclosure. As a result of this arrangement, the ladder rack assembly 300 and the vehicle 2 are able to carry and store twice as many ladders 5.

Figure 10:
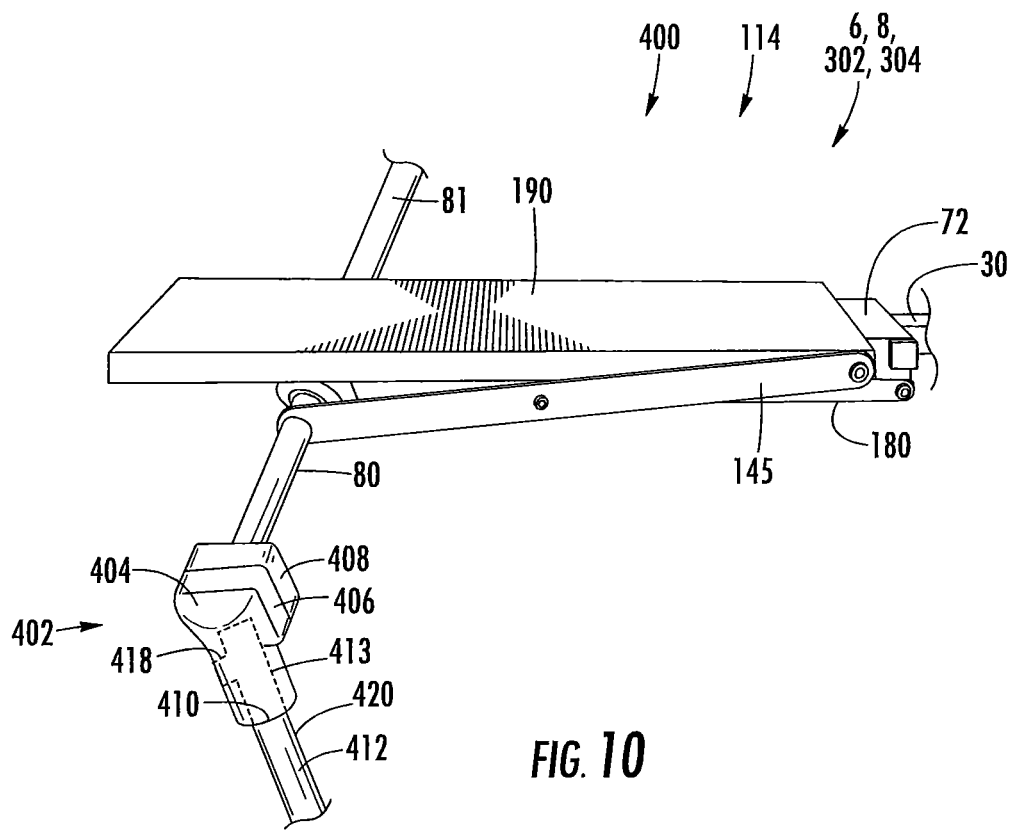
FIG. 10 is a schematic perspective view of a portion of a mechanism of a ladder rack assembly according to another embodiment of the disclosure.
Figure 11:
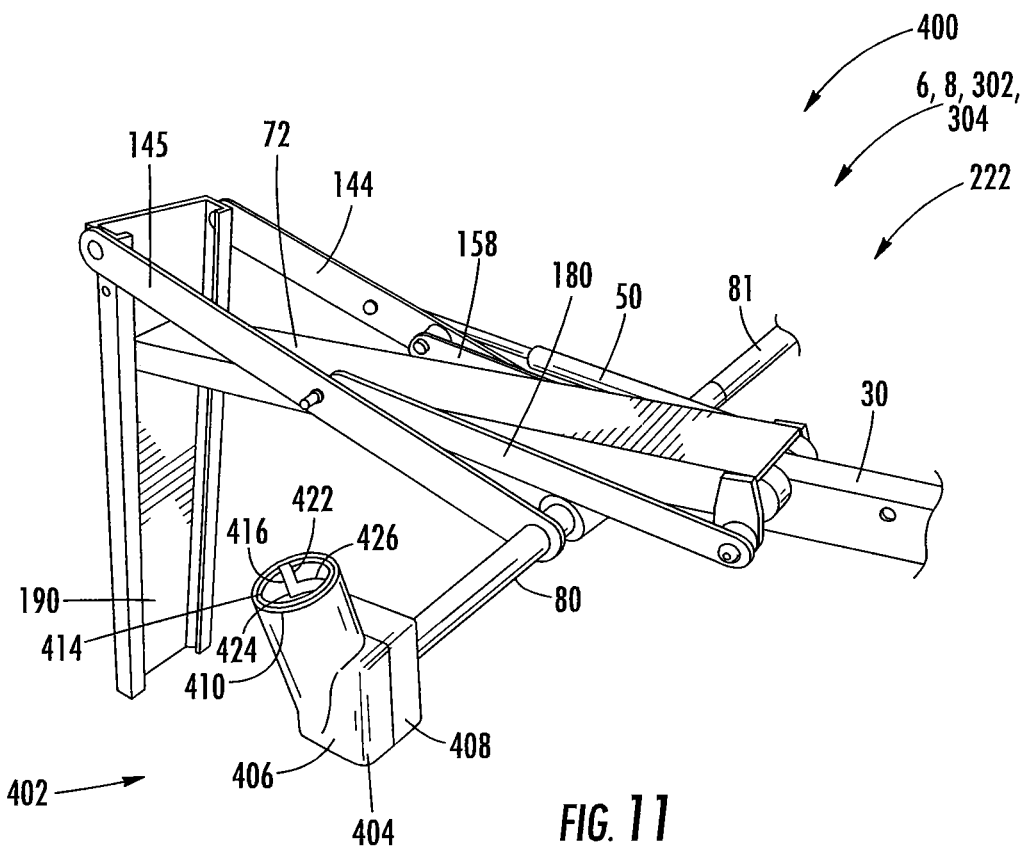
FIG. 11 is a schematic perspective view of a portion of the mechanism of the ladder rack assembly according to the embodiment illustrated in FIG. 10 of the disclosure.

FIGS. 10 and 11 provide a schematic perspective view of a ladder rack assembly 400 according to another embodiment of the disclosure. The ladder rack assembly 400 illustrated in FIGS. 10 and 11 is the same as the ladder rack assemblies 3 and 300 illustrated in FIGS. 1-9B, except where specifically noted below. In Accordance with the embodiment illustrated in FIGS. 10 and 11 of the disclosure and as a non-limiting example, the ladder rack assembly 400 may include one or more sources of rotational power 402. At least a portion of the rotational power generated by the one or more sources of rotational power 402 may be transferred to the one or more first shafts 80 in order to selectively translate the ladder rack assembly 400 between the first position 114, the second position 260 and the third position 222.

As best seen in FIG. 10 of the disclosure and as a non-limiting example, the one or more sources of rotational power 402 may include a housing assembly 404. The housing assembly 404 may include a first portion 406 and/or a second portion 408. The housing assembly 404 may be of a size and shape to receive and/or retain at least a portion of one or more drive members 412 therein. It is within the scope of this disclosure and as a non-limiting example that the first portion 406 may be integrally formed as part of the second portion 408 of the housing assembly 404 or the first portion 406 may be connected to at least a portion of the second portion 408 as separate components. As a result, it is within the scope of this disclosure and as a non-limiting example that the first portion 406 may be integrally connected to at least a portion of the second portion 408 of the housing assembly 404 by using one or more welds, one or more adhesives, one or more mechanical fasteners, a threaded connection, a spline connection, and/or an interference fit connection. As a non-limiting example, the one or more drive members 412 may be one or more rods, one or more shafts, one or more poles and/or one or more levers.

The first portion 406 of the housing assembly 404 may have a receiving portion 410 therein. The receiving portion 410 within the first housing portion 406 of the housing assembly 404 may have a size and shape to receive and/or retain at least a portion of a first end portion 413 of the one or more drive members 412 therein. It is within the scope of this disclosure and as a non-limiting example that the one or more drive members 412 may be integrally formed as part of the first portion 406 of the housing assembly 404 or may be connected to at least a portion of the first portion 406 of the housing assembly 404 as a separate component. As a result, it is within the scope of this disclosure and as a non-limiting example that the one or more drive members 412 may be integrally connected to the first portion 406 of the housing assembly 404 by using one or more welds, one or more adhesives, one or more mechanical fasteners, a threaded connection, a spline connection, a ball detent connection, and/or an interference fit connection.

As best seen in FIG. 11 of the disclosure and as a non-limiting example, a surface 414 defining the receiving portion 410 may have one or more grooves 416 therein. The one or more grooves 416 in the surface 414 of the receiving portion 410 may be of a size and shape to selectively receive and/or retain at least a portion of the first end portion 413 of the one or more drive members 410 therein. According to an embodiment of the disclosure and as a non-limiting example, the one or more grooves 416 in the receiving portion 410 may be of a size and shape to receive and/or retain at least a portion of one or more outwardly extending portions 418. In accordance with the embodiment illustrated in FIG. 10 of the disclosure and as a non-limiting example, the one or more outwardly extending portions 418 may extend axially outward from at least a portion of an outer surface 420 of the first end portion 413 of the one or more drive members 412. It is within the scope of this disclosure and as a non-limiting example that the one or more outwardly extending portions 418 may be integrally formed as part of the one or more drive members 410 or may be connected to at least a portion of the one or more drive members 412 as a separate component. As a result, it is within the scope of this disclosure and as a non-limiting example that the one or more outwardly extending portions 418 may be integrally connected to at least a portion of the one or more drive members 412 by using one or more welds, one or more adhesives, one or more mechanical fasteners, a threaded connection, a spline connection and/or an interference fit connection. As a non-limiting example, the one or more outwardly extending portions 418 of the one or more drive members 412 may extend substantially perpendicular relative to the one or more drive members 412.

In accordance with the embodiment illustrated in FIG. 11 of the disclosure and as a non-limiting example, the one or more grooves 416 in the receiving portion 410 may have a first portion 422, a second portion 424 and a third portion 426. The first portion 422 of the one or more grooves 416 may extend from a first end 428 of the receiving portion 410 toward the one or more first shafts 80. The first portion 422 of the one or more grooves 416 may be of a size and shape to receive and/or guide at least a portion of the one or more outwardly extending portions 418 into the one or more grooves 416 when inserting the first end portion 413 of the one or more drive members 412 into the receiving portion 410 of the housing assembly 404. As illustrated in FIG. 11 and as a non-limiting example, the second portion 424 of the one or more grooves 416 may connect at least a portion of the first portion 422 of the one or more grooves 416 to at least a portion of the third portion 426 of the one or more grooves 416. The third portion 426 of the one or more grooves 416 may be of a size and shape to receive and/or retain at least a portion of the one or more outwardly extending portions 418 of the one or more drive members 412 therein. It is within the scope of this disclosure and as a non-limiting example that at least a portion of the third portion 426 of the one or more grooves 416 may extend substantially perpendicular relative to the first portion 422 of the one or more grooves 416. Once in the second portion 424 of the one or more grooves 416 the one or more drive members 412 may be twisted in order to drive the one or more outwardly extending portions 418 into the third portion 426 of the one or more grooves 416. As a result, when the one or more outwardly extending portions 418 into the third portion 426 of the one or more grooves 416, the third portion 426 of the one or more grooves 416 may provide a positive stop preventing the one or more drive members 412 from inadvertently coming out of engagement with the receiving portion 410.

It is within the scope of this disclosure that the third portion 426 of the one or more grooves may have one or more features or portions (not shown) therein that aid in retaining the one or more drive members 412 relative to the housing assembly 404.

Once at least a portion of the first end portion 413 of the one or more drive members 412 have been securely received and/or retained within the receiving portion 410 of the housing assembly 404, an amount of force may be applied to the one or more drive members 412 in order to selectively rotate the one or more first shafts 80 as needed. As a result, this allows the one or more drive members 412 to selectively drive the ladder rack assembly 3 between the first position 114, the second position 260, and the third position 222.

Figure 12:
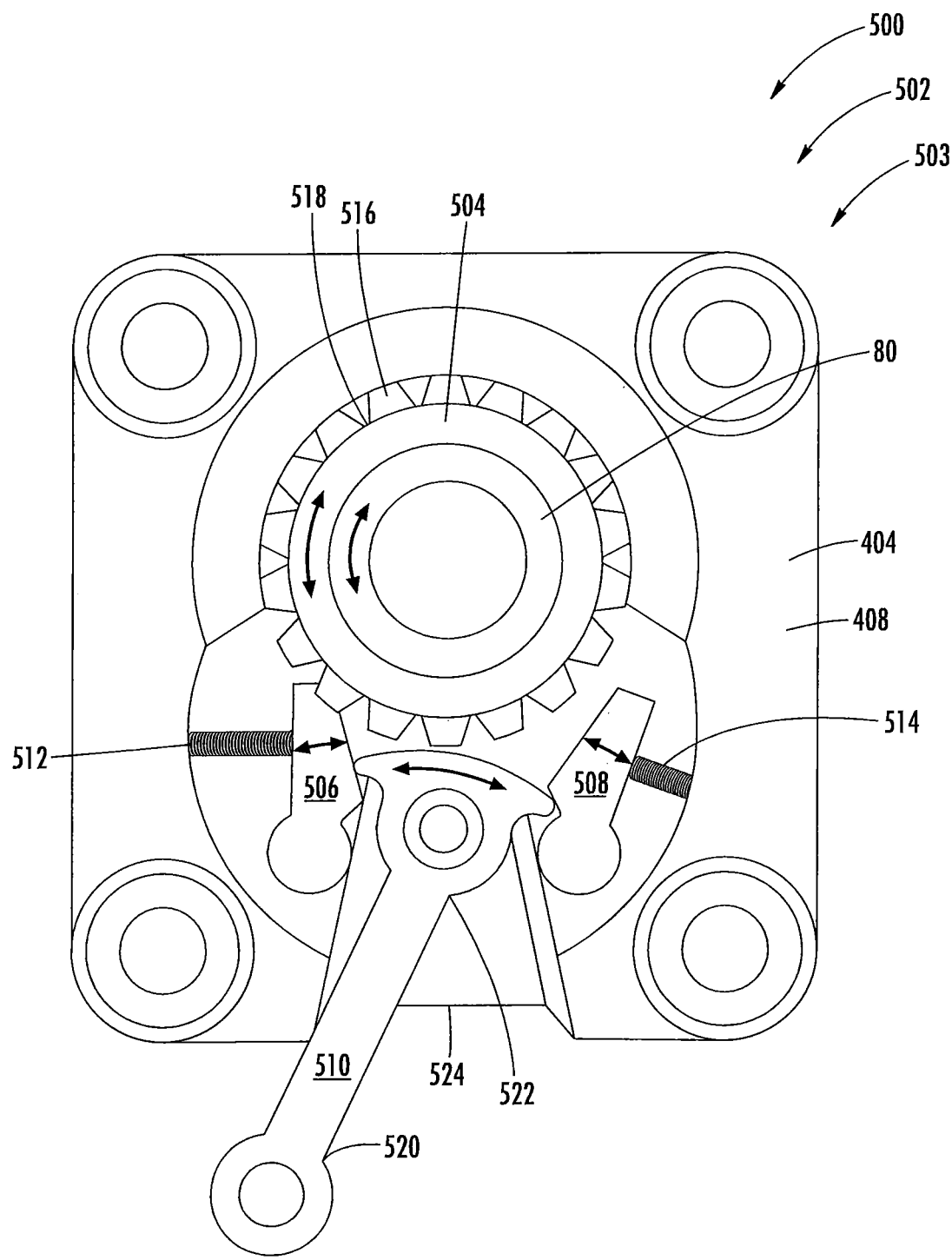
FIG. 12 is a schematic top-plan view of one or more sources of rotational power for use in the ladder rack assembly illustrated in FIGS. 1-11 according to another embodiment of the disclosure.

FIG. 12 provides a schematic top-plan view of a portion of one or more sources of rotational power 502 of the ladder rack assembly 500 according to another embodiment of the disclosure. The ladder rack assembly 500 illustrated in FIG. 12 is the same as the ladder rack assemblies 3, 300 and 400 illustrated in FIGS. 1-11, except where specifically noted below. Additionally, the one or more sources of rotational power 502 illustrated in FIG. 12 is the same as the one or more sources of rotational powers 254 and 402 illustrated in FIGS. 1-11, except where specifically noted below. In accordance with the embodiment illustrated in FIG. 12 of the disclosure and as a non-limiting example, the one or more sources of rotational power 502 may include one or more ratchet assemblies 503.

At least a portion of the one or more ratchet assemblies 503 of the one or more sources of rotational power 502 may be received and/or retained within at least a portion of the housing assembly 404. As best seen in FIG. 12 of the disclosure and as a non-limiting example, the one or more ratchet assemblies 503 may include one or more gears 504, one or more first pawls 506, one or more second pawls 508, one or more selectors 510, one or more first biasing members 512 and/or one or more second biasing members 514. The one or more gears 504 of the one or more ratchet assemblies 503 may be drivingly connected to at least a portion of the one or more first shafts 80 and/or the one or more sources of rotational power 502. It is therefore to be understood that the one or more gears 504 may aid in transferring the rotational power from the one or more sources of rotational power 502 to the one or more first shafts 80. It is within the scope of this disclosure and as a non-limiting example that the one or more gears 504 may be integrally formed as part of the one or more first shafts 80 or connected to the one or more first shafts 80 as separate components. As a result, it is within the scope of this disclosure and as a non-limiting example that the one or more gears 504 may be integrally connected to at the one or more first shafts 80 by using one or more welds, one or more adhesives, one or more mechanical fasteners, a threaded connection, a spline connection and/or an interference fit connection.

According to an embodiment of the disclosure and as a non-limiting example, as the one or more drive members 412 move, the one or drive members 412 of the one or more sources of rotational power 500 may drive the one or more gears 504 in a clock-wise or counter clock-wise manner. As the one or more gears 504 are driven in a clock-wise or counter clock-wise manner, the one or more gears 504 transfer the rotational power from the one or more drive members 412 to the one or more first shafts 80. This provides the one or more first shafts 80 with the rotational power needed to selectively translate the ladder rack assembly 500 between the first, second, and third positions 114, 260, and 222.

In accordance with an alternative embodiment of the disclosure and as a non-limiting example, the source of rotational power 502 may be drivingly connected to at least a portion of the one or more first shafts 80. It is within the scope of this disclosure and as a non-limiting example that the one or more sources of rotational power 502 may be drivingly connected to the one or more first shafts 80 by using one or more welds, one or more adhesives, one or more mechanical fasteners, a threaded connection, a spline connection, and/or an interference fit connection. As a result, it is therefore to be understood that as the one or more sources of rotational power 500 rotate in a close-wise or counter clock-wise manner, the one or more first shafts 80 are driven in a clock-wise or counter clock-wise manner. This provides the one or more first shafts 80 with the rotational power needed to selectively translate the ladder rack assembly 500 between the first, second, and third positions 114, 260, and 222.

The one or more first and/or second pawls 506 and/or 508 may be selectively engagable with a plurality of teeth 516 extending from an outer surface 518 of the one or more gears 504. Once engaged with the plurality of teeth 516, the one or more first and/or second pawls 506 and/or 508 aid in preventing the one or more first shafts 80 from being back driven or rotated in the opposite direction. This aids in increasing the overall safety associated with the operation of the ladder rack assembly 500. It is within the scope of this disclosure and as a non-limiting example that when the one or more gears 504 are driven in a clock-wise manner, the one or more first pawls 506 may engage the plurality of teeth 516 and prevent the one or more gears 504 and the one or more first shafts 80 from rotating in a counter clock-wise manner. Additionally, it is within the scope of this disclosure and as a non-limiting example that when the one or more gears 504 are driven in a counter clock-wise manner, the one or more second pawls 508 may engage the plurality of teeth 516 and prevent the one or more gears 504 and the one or more first shafts 80 from rotating in a clock-wise manner.

As illustrated in FIG. 12 of the disclosure and as a non-limiting example, at least a portion of the one or more first biasing members 512 may be connected to at least a portion of the housing assembly 404 and at least a portion of the one or more first pawls 506. Additionally, as illustrated in FIG. 12 and as a non-limiting example, at least a portion of the one or more second biasing members 514 may be connected to at least a portion of the housing assembly 404 and at least a portion of the one or more second pawls 508. The one or more first biasing members 512 may aid in providing the force needed to selectively translate the one or more first pawls 506 into engagement with the plurality of teeth 516 on the one or more gears 504. Additionally, the one or more second biasing members 514 may aid in providing the force needed to selectively translate the one or more second pawls 508 into engagement with the plurality of teeth 516 on the one or more gears 504.

At least a portion of the one or more selectors 510 may be interposed between the one or more first pawls 506 and the one or more second pawls 508 of the ratchet assembly 503. The one or more selectors 510 may be used in order to allow the one or more users (not shown) to selectively determine which direction the one or more first shafts 80 can rotate and not rotate. A first end portion 520 of the one or more selectors 510 may be disposed outside the housing assembly 404 providing the one or more users (not shown) with the access needed to selectively transition the one or more selectors 510 between a first and second position. A second end portion 522 of the one or more selectors 510 may extend through an opening 524 in the housing assembly 404 toward the one or more gears 504. It is within the scope of this disclosure and as a non-limiting example that when in the first position illustrated in FIG. 12, the second end portion 522 of the one or more selectors 510 may drive the one or more second pawls 508 out of engagement with the one or more gears 504 and allow the one or more first pawls 506 to engage the one or more gears 504. Additionally, it is within the scope of this disclosure and as a non-limiting example that when in the second position (not shown), the second end portion 522 of the one or more selectors 510 may drive the one or more first pawls 506 out of engagement with the one or more gears 504 and allow the one or more second pawls 508 to engage the one or more gears 504.

As a result, it is therefore to be understood that the one or more ratchet assemblies 503 of the source of rotational power 502 may allow the one or more users (not shown) to make smaller, easier and more convenient movements of the one or more drive members 412 as the ladder rack assembly 500 is selectively translated between the first, second and third positions 114, 260 and 222.

It is therefore to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed is:

1. A ladder rack assembly, comprising:
a base member having an inner surface, an outer surface, a first end portion, a second end portion, a first side, and a second side;
a sliding member having an inner surface, an outer surface, a first end, a second end, a first end portion, a second end portion, a first side portion; and a second side portion;
   wherein said sliding member is linearly slidable relative to said base member;
a ladder mounting member having an inner surface, an outer surface, a first end portion, a second end portion, a first side portion, and a second side portion;
   wherein said ladder mounting member is axially and radially movable relative to said base member;
one or more first shafts;
one or more first drive members having a first end portion, a second end portion and an intermediate portion interposed between said first and second end portions;
   wherein at least a portion of said first end portion of said one or more first drive members are drivingly connected to at least a portion of said one or more first shafts;
   wherein at least a portion of said second end portion of said one or more first drive members are pivotally connected to at least a portion of said first end portion of said first side portion of said ladder mounting member;
one or more first linkage members;
   wherein at least a portion of a first end portion of said one or more first linkage members are pivotally connected to at least a portion of said intermediate portion of said one or more first drive members; and
   wherein at least a portion of a second end portion of said one or more first linkage members are pivotally connected to at least a portion of said first end portion of said sliding member.

2. The ladder rack assembly of claim 1, wherein said ladder rack assembly has a first position, a second position and a third position;
   wherein in said first position said ladder rack assembly is in a compact form factor allowing one or more ladders to be stored thereon;
   wherein said second position is an intermediate position between said first and third portions; and
   wherein in said third position at least a portion of said ladder mounting member is disposed adjacent to and a distance away from said sliding member and/or said base member.

3. The ladder rack assembly of claim 2, wherein said base member has one or more first bumper members; and
   wherein at least a portion of said sliding member is in direct contact with at least a portion of said one or more first numbers when said ladder rack assembly is in said first position.

4. The ladder rack assembly of claim 2, wherein said sliding member has one or more first cut-back portions extending inward from at least a portion of said first end of a central top portion of said sliding member;
   wherein said one or more first cut-back portions have a size and shape to receive and/or retain at least a portion of said one or more bumper members therein; and
   wherein at least a portion of said one or more first cut-back portions are in direct contact with at least a portion of said one or more first bumper members when said ladder rack assembly is in said first position.

5. The ladder rack assembly of claim 2, wherein in said first position a central top portion of said ladder mounting member is substantially parallel to and disposed directly radially outboard from at least a portion of a central top portion of said sliding member, and said central top portion of said sliding member is substantially parallel to and disposed directly radially outboard form at least a portion of a central portion of said base member.

6. The ladder rack assembly of claim 2, wherein in said third position at least a portion of one or more second bumper members connected to said inner surface of said ladder mounting member are in direct contact with at least a portion of said outer surface of said sliding member.

7. The ladder rack assembly of claim 2, wherein in said third position at least a portion of said sliding member is disposed axially outboard from said base member and at least a portion of a central top portion of said sliding member is substantially parallel to at least a portion of a central portion of said base member; and
   wherein in said third position at least a portion of said ladder mounting member is disposed axially outward from and extends substantially vertical relative to at least a portion of said base member and said sliding member.

8. The ladder rack assembly of claim 1, further comprising one or more first mounting members and one or more first assist members;
   wherein at least a portion of said one or more first mounting members extend outward from at least a portion of said first end portion of said base member;
   wherein at least a portion of one or more first ball studs are integrally connected to or integrally formed as part of said one or more first mounting members;
   wherein at least a portion of one or more third ball studs are integrally connected to or integrally formed as part of said intermediate portion of said one or more first drive members; and
   wherein at least a portion of an end of said one or more first assist members are connected to at least a portion of said one or more first ball studs and said one or more third ball studs.

9. The ladder rack assembly of claim 8, wherein said one or more first assist members are one or more dampers, one or more hydraulic dampers, one or more pneumatic dampers, one or more hydraulic cylinders, one or more pneumatic cylinders and/or one or more gas springs.

10. The ladder rack assembly of claim 8, wherein said sliding member has one or more second cut-back portions;
   wherein said one or more second cut-back portions extend inward from at least a portion of said first end of said first side portion of said sliding member; and
   wherein said one or more second cut-back portions are of a size and shape to receive and/or retain at least a portion of said one or more first mounting members of said base member when said ladder rack assembly is in a first position.

11. The ladder rack assembly of claim 1, further comprising one or more first arms;
   wherein at least a portion of said one or more first arms are integrally connected to or integrally formed as part of at least a portion of said second end portion of said one or more first linkage members; and
   wherein said one or more first arms has one or more first apertures therein allowing said one or first more arms to be laid substantially parallel to said base member, said sliding member and/or said ladder mounting member.

12. The ladder mounting member of claim 1, further comprising one or more second drive members and one or more second linkage members;
    wherein said one or more second drive members have a first end portion, a second end portion and an intermediate portion interposed between said first and second end portions;
        wherein at least a portion of said first end portion of said one or more second drive members are drivingly connected to at least a portion of said one or more first shafts;
        wherein at least a portion of said second end portion of said one or more second drive members are pivotably connected to at least a portion of said first end portion of said second side portion of said ladder mounting member;
    wherein said one or more second linkage members have a first end portion and a second end portion;
        wherein at least a portion of said first end portion of said one or more second linkage members are pivotably connected to at least a portion of said intermediate portion of said one or more second drive members; and
        wherein at least a portion of said second end portion of said one or more second linkage members are pivotably connected to at least a portion of said first end portion of said sliding member.

13. The ladder rack assembly of claim 12, further comprising one or more second arms;
    wherein at least a portion of said one or more second arms are integrally connected to or integrally formed as part of at least a portion of said second end portion of said one or more second linkage members; and
    wherein said one or more second arms has one or more first apertures therein allowing said one or second more arms to be laid substantially parallel to said base member, said sliding member and/or said ladder mounting member.

14. The ladder rack assembly of claim 12, further comprising one or more second mounting members and one or more second assist members;
    wherein at least a portion of said one or more second mounting members extend outward from at least a portion of said first end portion of said base member;
    wherein at least a portion of one or more second ball studs are integrally connected to or integrally formed as part of said one or more second mounting members;
    wherein at least a portion of one or more fourth ball studs are integrally connected to or integrally formed as part of said intermediate portion of said one or more second drive members; and
    wherein at least a portion of an end of said one or more second assist members are connected to at least a portion of said one or more second ball studs and said one or more fourth ball studs.

15. The ladder rack assembly of claim 13, wherein said one or more second assist members are one or more dampers, one or more hydraulic dampers, one or more pneumatic dampers, one or more hydraulic cylinders, one or more pneumatic cylinders and/or one or more gas springs.

16. The ladder rack assembly of claim 13, wherein said sliding member has one or more third cut-back portions;
    wherein said one or more third cut-back portions extend inward from at least a portion of said first end of said second side portion of said sliding member; and
    wherein said one or more third cut-back portions are of a size and shape to receive and/or retain at least a portion of said one or more second mounting members of said base member when said ladder rack assembly is in a first position.

17. The ladder rack assembly of claim 1, further comprising one or more retention members having one or more retaining portions;
    wherein at least a portion of said one or more retention members are selectively connectable to at least a portion of said ladder mounting member; and
    wherein at least a portion of said one or more retaining portions of said one or more retaining members are selectively movable relative to said one or more retention members in order to retain at least a portion of one or more ladders therein.

18. The ladder rack assembly of claim 1, further comprising one or more third mounting members and/or one or more fourth mounting members;
    wherein at least a portion of said one or more third mounting member and/or said one or more fourth mounting member extend outward from at least a portion of said second end portion of said base member; and
    wherein at least a portion of said one or more third mounting member and/or said one or more fourth mounting member are connected to at least a portion of said one or more first shafts.

19. The ladder rack assembly of claim 1, wherein said sliding member has one or more first sliding member flanges and/or one or more second sliding member flanges;
    wherein said one or more first sliding member flanges extend inward from at least a portion of an end of said first side portion of said sliding member opposite a central top portion of said sliding member;
    wherein said one or more second sliding member flanges extend inward from at least a portion of an end of said second side portion of said sliding member opposite said central top portion of said sliding member;
    wherein said one or more first sliding member flanges, said first side portion, and said central top portion of said sliding member define a first sliding member space;
    wherein said one or more second sliding member flanges, said second side portion, and said central top portion of said sliding member define a second sliding member space; and
    wherein said first sliding member space and/or said second sliding member space are of a size and shape to receive and/or retain at least a portion of said base member therein.

20. The ladder rack assembly of claim 1, wherein said ladder mounting member has one or more first ladder mounting member flanges and/or one or more second ladder mounting member flanges;
    wherein said one or more first ladder mounting member flanges extend inward from an end of said first side portion of said ladder mounting member opposite a central top portion of said ladder mounting member;
    wherein said one or more second ladder mounting member flanges extend inward from an end of said second side portion of said ladder mounting member opposite said central top portion of said ladder mounting member;
    wherein said one or more first ladder mounting member flanges, said first side portion, and said central top portion of said ladder mounting member define a first ladder mounting member space;

wherein said one or more second ladder mounting member flanges, said second side portion, and said central top portion of said ladder mounting member define a second ladder mounting member space; and wherein said first ladder mounting member space and/or said second ladder mounting member space are of a size and shape to receive and/or retain at least a portion of one or more first and/or second rolling members connected to said second end portion of said sliding member therein.

21. The ladder rack assembly of claim 1, wherein at least a portion of an end of said one or more first shafts are drivingly connected to at least a portion of a source of rotational power.

22. The ladder rack assembly of claim 21, wherein said source of rotational power is one or more motors, one or more electric motors, one or more ratchet assemblies, one or more lever assemblies, one or more pulley assemblies, one or more chain drive assemblies, one or more shafts, one or more rods, one or more bars, and/or one or more gear assemblies.

* * * * *